(12) United States Patent
Kirsch et al.

(10) Patent No.: US 10,370,592 B2
(45) Date of Patent: Aug. 6, 2019

(54) DEVICE FOR REGULATING THE PASSAGE OF ENERGY

(71) Applicant: Merck Patent GmbH, Darmstadt (DE)

(72) Inventors: Peer Kirsch, Seeheim-Jugenheim (DE); Susann Beck, Darmstadt (DE); Michael Junge, Pfungstadt (DE); Andreas Beyer, Hanau (DE); Ursula Patwal, Reinheim (DE)

(73) Assignee: Merch Patent GmbH, Darmstadt (DE)

( * ) Notice: Subject to any disclaimer, the term of this patent is extended or adjusted under 35 U.S.C. 154(b) by 82 days.

(21) Appl. No.: 15/505,975

(22) PCT Filed: Aug. 10, 2015

(86) PCT No.: PCT/EP2015/001643
§ 371 (c)(1),
(2) Date: Feb. 23, 2017

(87) PCT Pub. No.: WO2016/029996
PCT Pub. Date: Mar. 3, 2016

(65) Prior Publication Data
US 2017/0267929 A1   Sep. 21, 2017

(30) Foreign Application Priority Data
Aug. 25, 2014  (EP) ..................................... 14002950

(51) Int. Cl.
| C09K 19/60 | (2006.01) |
| C09K 19/34 | (2006.01) |
| C09B 5/62 | (2006.01) |
| C09B 31/20 | (2006.01) |
| C09B 57/00 | (2006.01) |

(52) U.S. Cl.
CPC ............... *C09K 19/60* (2013.01); *C09B 5/62* (2013.01); *C09B 31/20* (2013.01); *C09B 57/00* (2013.01); *C09K 19/3497* (2013.01); *C09K 19/601* (2013.01); *C09K 19/606* (2013.01); *C09K 2219/13* (2013.01)

(58) Field of Classification Search
None
See application file for complete search history.

(56) References Cited

U.S. PATENT DOCUMENTS

2015/0299577 A1   10/2015   Junge et al.

FOREIGN PATENT DOCUMENTS

| JP | 2014035804 A | * | 2/2014 | |
| WO | 2013/102038 A1 | | 7/2013 | |
| WO | WO-2013102038 A1 | * | 7/2013 | ........... C08G 61/122 |
| WO | 2014/090373 A1 | | 6/2014 | |
| WO | 2015/090506 A1 | | 6/2015 | |

OTHER PUBLICATIONS

Qi et al., "Panchromatic small molecules for UV-Vis-NIR photodetectors with high detectivity", 2014, Journal of Materials Chemistry C, vol. 2 No. 13, 2431-2438. (Year: 2014).*
Kminek et al., "Low-Band Gap Copolymers Containing Thienothiadiazole Units: Synthesis, Optical, and Electrochemical Properties", 2010, Journal of Polymer Science Part A, vol. 48, No. 13, 2743-2756. (Year: 2010).*
Mikroyannidis et al., "Low band gap conjugated small molecules containing benzobisthiadiazole and thienothiadiazole central units: synthesis and application for bulk heterojunction solar cells", 2011, Journal of Materials Chemistry, vol. 21 No. 12, 4679-4688. (Year: 2011).*
Zhou et al., "Tuning Energy Levels of Low Bandgap Semi-Random Two Acceptor Copolymers", 2013, Macromolecules, vol. 46, 3391-3394. (Year: 2013).*
English translation of JP2014035804. (Year: 2014).*
Tanaka et al., "Syntheses of narrow band gap heterocyclic copolymers of aromatic-donor and quinonoid-acceptor units", 1995, Synthetic Metals, vol. 69, 599-600. (Year: 1995).*
Hwang et al., "New Thienothiadiazole-Based Conjugated Copolymers for Electronics and Optoelectronics", Apr. 19, 2012, Macromolecules, vol. 45, 3732-3739. (Year: 2012).*
Bower et al., "The Synthesis of Two Neoclassical Thienothiadiazoles", Nov. 19, 1969, Journal of the American Chemical Society: Communications to the Editor, vol. 91, Iss 24, 6891-6892. (Year: 1969).*
Sharma et al., "Dithienylthienothiadiazole-based organic dye containing two cyanoacrylic acid anchoring units for dye-sensitized solar cells", 2012, RSC Advances, vol. 2, 11457-11464. (Year: 2012).*
Karsten et al., "Electronic structure of small band gap oligomers based on cyclopentadithiophenes and acceptor units", Apr. 28, 2009, Journal of Materials Chemistry, vol. 19, 5343-5350. (Year: 2009).*
Steinberger et al., "Synthesis and characterizations of red/near-IR absorbing A-D-A-D-A-type oligothiophenes containing thienothiadiazole and thienopyrazine central units", 2012, Journal of Materials Chemistry, vol. 22, 2701-2712. (Year: 2012).*

(Continued)

*Primary Examiner* — Cynthia H Kelly
*Assistant Examiner* — Anna Malloy
(74) *Attorney, Agent, or Firm* — Millen White Zelano & Branigan, PC

(57) ABSTRACT

A device for regulating the passage of energy from an outside space into an inside space includes a switching layer, where the switching layer comprises one or more compounds of the formula:

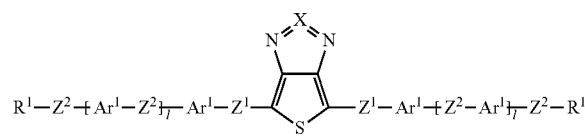

wherein $R^1$, $Z^1$, $Z^2$, $Ar^1$ and X are defined herein.

21 Claims, No Drawings

(56) References Cited

OTHER PUBLICATIONS

Shen et al., "Synthesis of thienoselenadiazole-containing conjugated copolymers and their application in polymer solar cells", Mar. 28, 2012, Polymer Journal, vol. 44, 978-981. (Year: 2012).*
English translation Abstract of WO2015090506A1 published Jun. 25, 2015 (1 page).
International Search Report dated Nov. 10, 2015, issued in corresponding PCT/EP2015/001643, 3 pages.
Qi, J. et al., "Panchromatic small molecules for UV-Vis-NIR photodetectors with high detectivity", J. Mater. Chem. C, vol. 2, 2014, pp. 2431-2438.
Kminek, I. et al., "Low-Band Gap Copolymers Containing Thienothiadiazole Units: Synthesis, Optical, and Electrochemical Properties", Journal of Polymer Science: Part A: Polymer Chemistry, XP008162027, vol. 48, 2010, pp. 2743-2756.
Mikroyannidis, J.A. et al., "Low band gap conjugated small molecules containing benzobisthiadiazole and thienothiadiazole central units: synthesis and application for bulk heterojunction solar cells", J. Mater. Chem., vol. 21, 2011, pp. 4679-4688.

* cited by examiner

DEVICE FOR REGULATING THE PASSAGE OF ENERGY

The present application relates to a device for regulating the passage of energy from an outside space into an inside space, to compounds, windows and uses of the devices and compounds.

A device for regulating the passage of energy is in the present application generally taken to mean a device which regulates the passage of energy through an area which has relatively high energy transmissivity. This area of relatively high energy transmissivity is preferably arranged within a structure of relatively lower energy transmissivity. For example, the area of high energy transmissivity can be a glass area or an open area, and the structure of lower energy transmissivity which contains the area of high energy transmissivity can be a wall.

The device preferably regulates the passage of energy from insolation, either directly or indirectly.

The regulated passage of energy takes place from an outside space, preferably the environment exposed directly to insolation, into an inside space, for example a building or a vehicle, or another unit which is substantially sealed off from the environment.

For the purposes of the present invention, the term energy is taken to mean, in particular, energy by electromagnetic radiation in the UV-A, VIS and NIR region. In particular, it is taken to mean energy by radiation which is not absorbed or is only absorbed to a negligible extent by the materials usually used in windows (for example glass). According to the definitions usually used, the UV-A region is taken to mean a wavelength of 320 to 380 nm, the VIS region is taken to mean a wavelength of 380 nm to 780 nm and the NIR region is taken to mean a wavelength of 780 nm to 2000 nm. Correspondingly, the term light is generally taken to mean electromagnetic radiation having wavelengths between 320 and 2000 nm.

For the purposes of the present application, a dichroic dye is taken to mean a light-absorbent compound in which the absorption properties are dependent on the alignment of the compound with the polarisation direction of the light. A dichroic dye compound typically has an elongated shape, i.e. the compound is significantly longer in one spatial direction (longitudinal direction) than in the other two spatial directions.

In the area of devices for regulating the passage of energy from an outside space into an inside space, a number of different technical solutions have been proposed in past years.

An advantageous solution is the use of switching layers comprising a liquid-crystalline medium in combination with one or more dichroic dyes. By application of a voltage, a change in the spatial alignment of the molecules of the dichroic compound can be achieved in these switching layers, causing a change in their absorption and thus the transmission through the switching layer. A corresponding device is described, for example, in WO 2009/141295.

Alternatively, a change in transmission of this type can also be achieved without electrical voltage by a temperature-induced transition from an isotropic state of the liquid-crystalline medium to a liquid-crystalline state, as described, for example, in US 2010/0259698.

It is furthermore known to design devices having a switching layer comprising a liquid-crystalline medium comprising at least one dichroic dye in such a way that the energy absorbed by the dye is partly re-emitted as fluorescence radiation, which is itself conducted to a solar cell, which converts it into electrical energy (WO 2009/141295).

Rylene dyes have been described for use in the said devices, for example in WO 2009/141295.

It is of particular interest to employ fluorescent dyes, which are known for their high light fastness, for the said purposes. These include perylene and terrylene derivatives, but their stability does not meet the extreme requirements for use in windows. Although benzothiadiazole and diketo-pyrrolo-pyrrole derivatives meet the requirements with respect to light fastness and dichroism, they generally absorb, however, at excessively short wavelengths, meaning that the blue-green colour region can only be covered to an inadequate extent (Zhang et al., J. Material. Chem. 2004, 14, 1901-1904; WO2004/090046).

WO2010/031479A1 describes a process in which polymers containing bis(thienocyclopenta)benzothiadiazole sub-units are prepared. The polymers can be employed as organic semiconductors.

The synthesis of thienothiadiazoles has been described by Tanaka et al., 1994 (Heterocycles, 37, 2, 693-695). Thienothiadiazoles can be employed as intermediates for the synthesis of photoactive polymers.

WO2013/102038 describes semiconductors containing thienothiadiazole sub-units and the uses thereof, in particular as transistors and in solar cells. The compounds generally contain a central aromatic structural unit which is substituted at two positions by thienothiadiazole sub-units, which are themselves substituted by further aromatic structural units. Overall, the compounds generally have a rod-shaped structure which contains two thienothiadiazole sub-units. In addition, two compounds are described which contain only one thienothiadiazole sub-unit each, and their use as electron-transport materials is proposed (Examples 15 to 17). Applications for regulating the passage of energy from an outside space into an inside space are not disclosed.

Steinberger et al., 2012 (J. Mater. Chem., 22, 2701-2712) describe the preparation of compounds containing a thienothiadiazole sub-unit, and propose uses in solar cells in combination with C60 fullerenes. Applications for regulating the passage of energy from an outside space into an inside space are not disclosed.

Sharma et al., 2012 (RSC Advances, 2(30), 11457-11464) describe a compound containing a thienothiadiazole sub-unit and cyanoacrylic acid substituents, and the use thereof as dye. Applications for regulating the passage of energy from an outside space into an inside space are not disclosed.

In the case of the known devices for regulating the passage of energy, there is great interest in the development of improved devices and compounds which are suitable for this purpose.

The invention is therefore based on the object of providing novel, improved devices and compounds for regulating the passage of energy from an outside space into an inside space which overcome the disadvantages described above. The devices and compounds should be suitable for use, in particular, in a switching layer.

The invention is based, in particular, on the object of providing novel dyes having strong fluorescence, high light fastness, a high dichroic ratio and good solubility in typical liquid-crystal mixtures. The compounds should meet the particular demands made in applications in connection with windows, in particular in active, liquid crystal-based shading devices.

The compounds should have strong light absorption in the VIS and/or NIR region of light. The invention is based, in particular, on the object of providing devices and compounds which exhibit good absorption above 580 nm. For devices which convert emitted fluorescent light into electrical energy, it is furthermore of great interest that the compounds have a high fluorescence quantum yield, high relative fluorescence from wave conduction and a high Stokes shift.

The devices and compounds should also have a long lifetime and a large switching range (i.e. the difference in transmission in the bright state to the dark state). Furthermore, there is potential for improvement with respect to the energy yield in the case of devices which utilise the fluorescence emission of the dyes for the recovery of energy by means of a solar cell. In the optimum case, the energy provided by the solar cell should be sufficient in order to provide all the energy necessary for operation of the device, or even exceed this amount.

Surprisingly, it has now been found that the said technical objects are achieved by devices, compounds, windows and uses in accordance with the patent claims. The invention relates to a device for regulating the passage of energy from an outside space into an inside space, where the device comprises a switching layer, where the switching layer comprises one or more compounds of the formula (I):

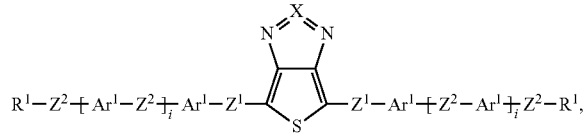

formula (I)

where:
X is equal to S or Se;
$Z^1$ is, independently of one another, a single bond, —$CR^3$=$CR^3$— or —C≡C—; or two, three, four or five groups combined with one another, selected from the groups —$CR^3$=$CR^3$— and —C≡C—;
$Z^2$ is, independently of one another, a single bond, O, S, $C(R^3)_2$, —$CR^3$=$CR^3$— or —C≡C—; or two, three, four or five groups combined with one another, selected from the groups O, S, $C(R^3)_2$, —$CR^3$=$CR^3$— and —C≡C—;
$Ar^1$ is, independently of one another, an aryl or heteroaryl group having 5 to 30 aromatic ring atoms, which may be substituted by one or more radicals $R^4$;
$R^1$ is, independently of one another, H, D, F, CN, $N(R^5)_2$, or an alkyl, alkoxy or thioalkoxy group having 1 to 20 C atoms, which may be substituted by one or more radicals $R^5$, where one or more $CH_2$ groups in the alkyl, alkoxy or thioalkoxy groups may be replaced by —$R^5$C=$CR^5$—, —C≡C—, C=O, C=S, —C(=O)O—, —OC(=O)—, $Si(R^5)_2$, $NR^5$, —O— or —S—;
$R^3$, $R^4$ are, independently of one another, H, D, F, Cl, CN, or an alkyl, alkoxy or thioalkoxy group having 1 to 10 C atoms, which may be substituted by one or more radicals $R^5$, where one or more $CH_2$ groups in the alkyl, alkoxy or thioalkoxy groups may be replaced by —$R^5$C=$CR^5$—, —C≡C—, C=O, C=S, —C(=O)O—, —OC(=O)—, $Si(R^5)_2$, $NR^5$, —O— or —S—;
$R^5$ is, independently of one another, H, D, F, Cl, CN, $N(R^6)_2$, an alkyl, alkoxy or thioalkoxy group having 1 to 10 C atoms or an alkenyl or alkynyl group having 2 to 20 C atoms, where the above-mentioned groups may each be substituted by one or more radicals $R^6$ and where one or more $CH_2$ groups in the above-mentioned groups may be replaced by —$R^6$C=$CR^6$—, —C≡C—, C=O, C=S, —C(=O)O—, —O(C=O)—, $Si(R^6)_2$, $NR^6$, —O— or —S—, or an aryl or heteroaryl group having 5 to 30 aromatic ring atoms, which may in each case be substituted by one or more radicals $R^6$;
$R^6$ is, independently of one another, H, F or an aliphatic organic radical having 1 to 20 C atoms, in which one or more H atoms may be replaced by F, or an aryl or heteroaryl group having 5 to 20 C atoms, in which one or more H atoms may be replaced by F;
i is, independently of one another, equal to 0, 1, 2, 3, 4 or 5.

If i is greater than 1, the groups within the brackets may be identical or different.

If i is equal to 0, the group within the brackets is absent, and the groups $Ar^1$ and $Z^2$ are connected directly to one another.

The compound of the formula (I) is a dye. This means that it at least partially absorbs light in the visible region. The compound of the formula (I) is preferably dichroic. This means that it absorbs light to different extents depending on the polarisation. The compound is, in particular, a dichroic dye.

The formulation "two, three, four or five groups combined with one another, selected from the groups . . . " in the sense of the present application is taken to mean that the groups are bonded to one another, preferably in the form of a chain in which two, three, four or five of the groups are bonded to one another. Preference is given to a combination of precisely two or three groups. The groups can generally be identical or different.

The compound of the formula (I) preferably has two or three aromatic groups on each side of the central unit. The groups depicted in formula (I), which may be substituted, form a chain.

In the formula (I), the groups shown can generally be identical to or different from one another. Thus, if a compound of the formula (I) contains two or more groups which are denoted by identical placeholders in the formula, such as, for example, $Ar^1$, the two or more groups $Ar^1$ may be identical to or different from one another.

An aryl group in the sense of this invention contains 6 to 30 aromatic ring atoms; a heteroaryl group in the sense of this invention contains 5 to 30 aromatic ring atoms, at least one of which is a heteroatom. The heteroatoms are preferably selected from N, O and S. This represents the basic definition. If other preferences are indicated in the description of the present invention, for example with respect to the number of aromatic ring atoms or the heteroatoms present, these apply.

An aryl group or heteroaryl group here is taken to mean either a simple aromatic ring, i.e. benzene, or a simple heteroaromatic ring, for example pyridine, pyrimidine or thiophene, or a condensed (annellated) aromatic or heteroaromatic polycycle, for example naphthalene, phenanthrene, quinoline or carbazole. A condensed (annellated) aromatic or heteroaromatic polycycle in the sense of the present application consists of two or more simple aromatic or heteroaromatic rings condensed with one another. A polycycle of this type may also contain individual non-conjugated units, as in the case, for example, of the fluorene basic structure.

An aryl or heteroaryl group, which may in each case be substituted by the above-mentioned radicals and which may be linked to the aromatic or heteroaromatic ring system via any desired positions, is taken to mean, in particular, groups derived from benzene, naphthalene, anthracene, phenanthrene, pyrene, dihydropyrene, chrysene, perylene, fluoranthene, benzanthracene, benzophenanthrene, tetracene, pentacene, benzopyrene, fluorene, spirobifluorene, furan, benzofuran, isobenzofuran, dibenzofuran, thiophene, benzothiophene, isobenzothiophene, dibenzothiophene, benzodithiophene, cyclopentadithiophene, thienothiophene, indenothiophene, dithienopyrrole, silolodithiophene, selenophene, benzoselenophene, dibenzoselenophene, pyrrole, indole, isoindole, carbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyridimidazole, pyrazinimidazole, quinoxalinimidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzopyrimidine, quinoxaline, pyrazine, phenazine, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine and benzothiadiazole.

For the purposes of the present invention, an alkyl group having 1 to 10 C atoms or an alkenyl or alkynyl group having 2 to 10 C atoms, in which, in addition, individual H atoms or $CH_2$ groups may be substituted by the groups mentioned above under the definition of the radicals, is preferably taken to mean the radicals methyl, ethyl, n-propyl, i-propyl, n-butyl, i-butyl, s-butyl, t-butyl, 2-methylbutyl, n-pentyl, s-pentyl, cyclopentyl, neopentyl, n-hexyl, cyclohexyl, neohexyl, n-heptyl, cycloheptyl, n-octyl, cyclooctyl, 2-ethylhexyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl or octynyl.

An alkoxy or thioalkoxy group having 1 to 10 C atoms is preferably taken to mean methoxy, trifluoromethoxy, ethoxy, n-propoxy, i-propoxy, n-butoxy, i-butoxy, s-butoxy, t-butoxy, n-pentoxy, s-pentoxy, 2-methylbutoxy, n-hexoxy, cyclohexyloxy, n-heptoxy, cycloheptyloxy, n-octyloxy, cyclooctyloxy, 2-ethylhexyloxy, pentafluoroethoxy, 2,2,2-trifluoroethoxy, methylthio, ethylthio, n-propylthio, i-propylthio, n-butylthio, i-butylthio, s-butylthio, t-butylthio, n-pentylthio, s-pentylthio, n-hexylthio, cyclohexylthio, n-heptylthio, cycloheptylthio, n-octylthio, cyclooctylthio, 2-ethylhexylthio, trifluoromethylthio, pentafluoroethylthio, 2,2,2-trifluoroethylthio, ethenylthio, propenylthio, butenylthio, pentenylthio, cyclopentenylthio, hexenylthio, cyclohexenylthio, heptenylthio, cycloheptenylthio, octenylthio, cyclooctenylthio, ethynylthio, propynylthio, butynylthio, pentynylthio, hexynylthio, heptynylthio or octynylthio.

An aliphatic organic radical having 1 to 20 C atoms is in principle taken to mean any desired organic radical which is not aromatic or heteroaromatic. It is preferably taken to mean alkyl groups having 1 to 10 C atoms, alkoxy groups having 1 to 10 C atoms or alkenyl or alkynyl groups having 2 to 10 C atoms, as described in greater detail above.

X preferably stands for S. The central group in formula (I) is then a thienothiadiazole group. For the purposes of this application, the term "thienothiadiazole" is used as a short form of "thieno[3,4-c]-1,2,5-thiadiazole".

$Z^1$ preferably stands on each occurrence, identically or differently, for a single bond, —$CR^3$=$CR^3$— or —C≡C—.

$Z^1$ is particularly preferably a single bond. $Z^2$ preferably stands on each occurrence, identically or differently, for a single bond, —$C(R^3)_2C(R^3)_2$—, —$CR^3$=$CR^3$—, —C≡C—, —$OC(R^3)_2$— or —$C(R^3)_2O$—, particularly preferably for a single bond, —$CH_2CH_2$—, —$CF_2CF_2$—, —CH=CH—, —CF=CF—, —C≡C—, —$OCH_2$—, —$OCF_2$—, —$CH_2O$— or —$CF_2O$—. $Z^2$ is particularly preferably a single bond.

$Ar^1$ preferably represents on each occurrence, identically or differently, an aryl group having 6 to 15 C atoms or a heteroaryl group having 5 to 15 C atoms, which may be substituted by one or more radicals $R^4$. $Ar^1$ is particularly preferably selected on each occurrence, identically or differently, from benzene, fluorene, naphthalene, pyridine, pyrimidine, pyrazine, triazine, thiophene, thiophene with condensed-on 1,4-dioxane ring, benzothiophene, dibenzothiophene, benzodithiophene, cyclopentadithiophene, thienothiophene, indenothiophene, dithienopyrrole, silolodithiophene, selenophene, benzoselenophene, dibenzoselenophene, furan, benzofuran, dibenzofuran and quinoline, each of which is optionally substituted by radicals $R^4$. Particular preference is given to benzene or thiophene, each of which may optionally be substituted by F.

The group $R^1$ is preferably on each occurrence, identically or differently, H, F, CN, $N(R^5)_2$, or a straight-chain alkyl or alkoxy group having 1 to 20 C atoms, which may be substituted by one or more radicals $R^5$, or a branched alkyl or alkoxy group having 3 to 20 C atoms, which may be substituted by one or more radicals $R^5$, or a cyclic alkyl group having 4 to 8 C atoms, which may be substituted by one or more radicals $R^5$, where one or more $CH_2$ groups in the alkyl and alkoxy groups may be replaced by —O—, —S— or —$R^5C$=$CR^5$—, or a siloxanyl group having 1 to 10 Si atoms, which may be substituted by one or more radicals $R^5$.

$R^1$ is particularly preferably on each occurrence, identically or differently, H, F, or a straight-chain alkyl or alkoxy group having 3 to 20 C atoms, or 3 to 10 C atoms, which may be substituted by one or more radicals $R^5$, or a branched alkyl or alkoxy group having 3 to 20 C atoms, which may be substituted by one or more radicals $R^5$, or a cyclic alkyl group having 6 C atoms, which may be substituted by one or more radicals $R^5$, where one or more $CH_2$ groups in the alkyl and alkoxy groups may be replaced by —O—, —S— or —$R^5C$=$CR^5$—, or a siloxanyl group having 1 to 6 Si atoms, which may be substituted by one or more radicals $R^5$, or an $N(R^5)_2$ group.

$R^1$ is very particularly preferably selected from a straight-chain alkyl or alkoxy group having 3 to 20, in particular 3 to 10, C atoms, or a branched alkyl or alkoxy group having 3 to 20, in particular 3 to 10, C atoms, or a cyclic alkyl group having 6 C atoms, or an $N(R^{10})_2$ group, where $R^{10}$ is alkyl having 1 to 10 C atoms.

In an embodiment, the radicals $R^1$ do not contain fluorine and/or —CN. In a further embodiment, they do not contain a —$CF_3$ group.

$R^3$ is preferably on each occurrence, identically or differently, H, F, or an alkyl group having 1 to 10 C atoms, which may be substituted by one or more radicals $R^5$. $R^3$ is particularly preferably on each occurrence, identically or differently, H or F.

$R^4$ is preferably on each occurrence, identically or differently, H, D, F, CN, or an alkyl or alkoxy group having 1 to 10 C atoms, which may be substituted by one or more radicals $R^5$. $R^4$ is particularly preferably on each occurrence, identically or differently, H or F.

$R^5$ is on each occurrence, identically or differently, H, F, CN, or an alkyl or alkoxy group having 1 to 10 C atoms, which may be substituted by one or more radicals $R^6$, or an aryl or heteroaryl group having 5 to 30 aromatic ring atoms, which may in each case be substituted by one or more radicals $R^6$, or a siloxanyl group having 1 to 6 Si atoms, which may be substituted by one or more radicals $R^6$.

The index i is preferably equal to 1, 2 or 3, particularly preferably equal to 1 or 2, very particularly preferably equal to 1.

The compounds of the formula (I) are not polymers, i.e. they have not been prepared by means of polymerisation. They thus differ crucially from the thienothiadiazole derivatives described in the prior art for photo- and electrochemistry, which are generally polymers.

The compounds of the formula (I) preferably have in total 3 to 5 aromatic ring structures. Aromatic ring structure thus denotes a ring, or an annellated ring system, which preferably has 2 to 4 annellated rings. The compound of the formula (I) preferably has 5 ring systems, namely a central thienothiadiazole group and 2 aromatic rings connected to one another on each side.

The radicals $R^1$ preferably each have at least 2 C atoms, in particular each have at least one alkyl chain having at least 2 C atoms.

The compounds of the formula (I) particularly preferably have in total 3 to 5 aromatic ring structures, and the radicals $R^1$ each have at least one alkyl chain having at least 2 C atoms.

In a preferred embodiment, the compound of the formula (I) is a chiral compound. It is preferably employed as racemate or as a mixture of stereoisomers (d, l or meso). The compound of the formula (I) preferably has one or two branched side chains $R^1$, which have a centre of chirality.

In a preferred embodiment, the compound of the formula (I) is asymmetrical. The two substituents on the central unit are not identical here. Such compounds often have particular electrochemical properties, in particular particular fluorescence properties.

In a preferred embodiment, the compound of the formula (I) has mesophases at <200° C.

Preferred embodiments of the formula (I) are the following formulae (Ia) and (Ib):

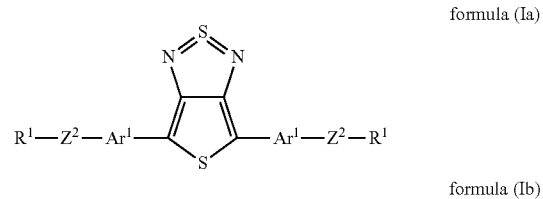

formula (Ia)

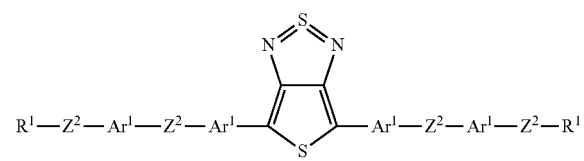

formula (Ib)

where the groups occurring are defined as above.

For formulae (Ia) and (Ib), the above-mentioned preferred embodiments of the groups $Ar^1$, $Z^2$ and $R^1$ preferably apply.

In accordance with the invention and in particular for the formulae (Ia) and (Ib), it is preferred that at least one $Ar^1$ bonded directly to thienothiadiazole stands for a sulfur-containing heteroaryl group, particularly preferably for thiophene. The group may be substituted by one or more radicals $R^4$. Compounds of this type are distinguished by particularly high light stability.

In a preferred embodiment, all radicals $Z^1$ and $Z^2$ are single bonds. The compound of the formula (I) then has the formula (Ic):

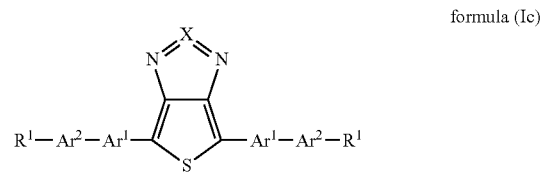

formula (Ic)

where the groups occurring are defined as above. The formulae (Ic) and (Ib) preferably contain the above-mentioned preferred groups $Ar^1$ and $R^1$, where $Ar^2$ is selected like $Ar^1$.

Preferred embodiments of compounds of the formulae (Ia) and (Ib) are those of the following formulae (Ia-1) to (Ia-4) and (Ib-1) to (Ib-4):

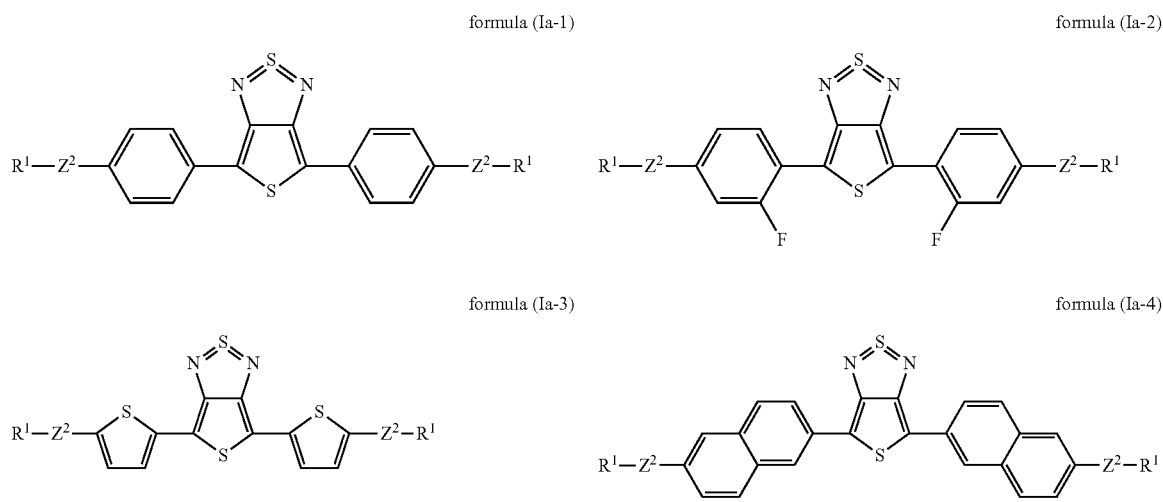

formula (Ia-1)

formula (Ia-2)

formula (Ia-3)

formula (Ia-4)

-continued formula (Ib-1)

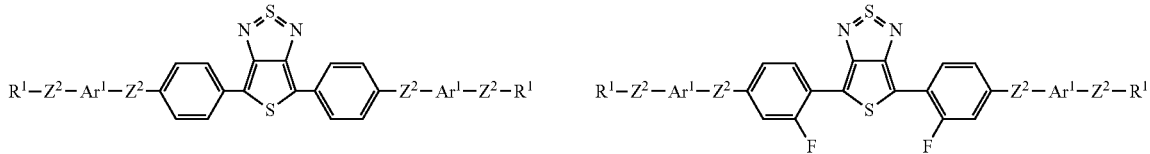

formula (Ib-2)

formula (Ib-3)

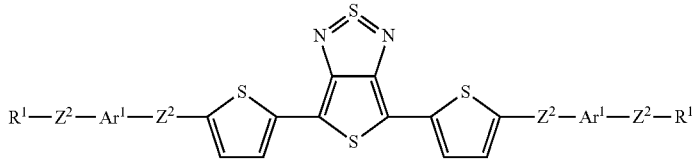

formula (Ib-4)

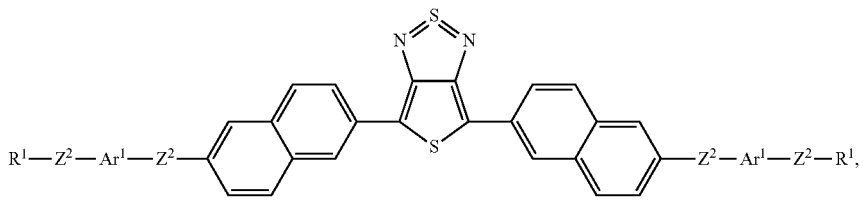

where the groups $Ar^1$, $Z^2$ and $R^1$ occurring are defined as indicated above.

Particularly preferred compounds of the formula (I) are those of the following formulae (IIa) to (IIc):

formula (IIa)

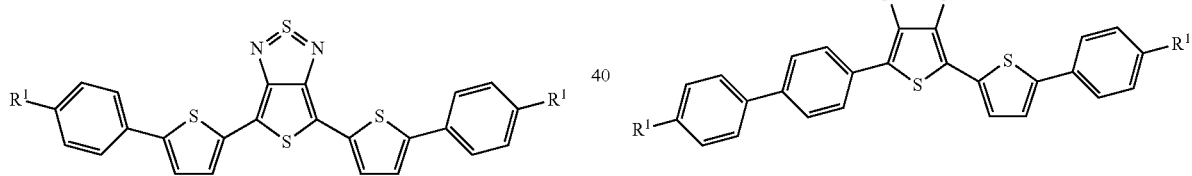

formula (IIb)

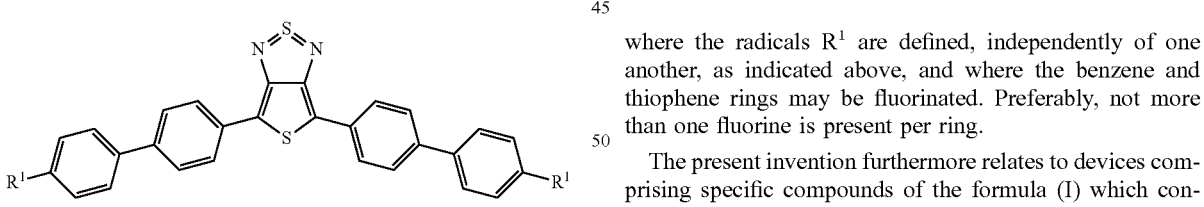

-continued formula (IIc)

where the radicals $R^1$ are defined, independently of one another, as indicated above, and where the benzene and thiophene rings may be fluorinated. Preferably, not more than one fluorine is present per ring.

The present invention furthermore relates to devices comprising specific compounds of the formula (I) which conform to the following formulae (III) and (IV):

formula (III)

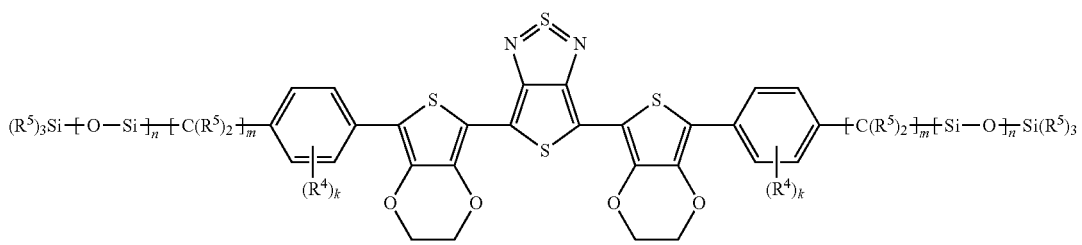

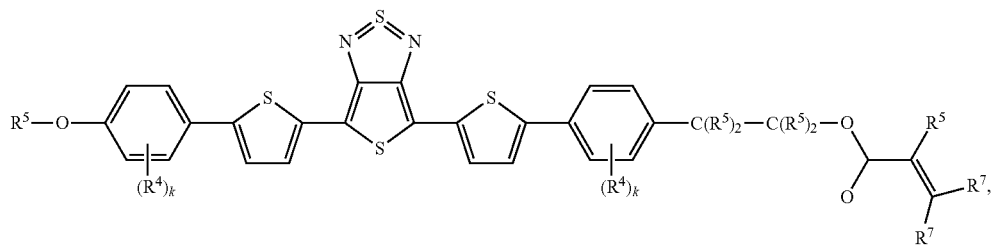

formula (IV)

where:
the groups $R^4$ and $R^5$ occurring are defined as above, $R^7$ is defined like $R^5$ above, and
k is, identically or differently on each occurrence, 0, 1, 2, 3 or 4;
m is, identically or differently on each occurrence, 0, 1, 2, 3, 4, 5 or 6;
n is, identically or differently on each occurrence, 1, 2, 3, 4 or 5.

In a preferred embodiment, the index k in the formulae (III) and (IV) is, identically or differently, 0 or 1, particularly preferably identically 0.

In a preferred embodiment, the index m in the formulae (III) and (IV) is, identically or differently, 0, 1 or 2, particularly preferably identically 1 or 2.

In a preferred embodiment, the index n in the formulae (III) and (IV) is, identically or differently, 1, 2 or 3, particularly preferably identically 2.

Furthermore preferably, $R^5$ in the formulae (III) and (IV) is hydrogen or an alkyl group having 1 to 5 C atoms, which may be substituted by one or more radicals $R^6$, particularly preferably methyl.

In a preferred embodiment, $R^7$ in the formulae (III) and (IV) is hydrogen or an alkyl group having 1 to 5 C atoms, which may be substituted by one or more radicals $R^6$, particularly preferably hydrogen.

The compounds of the formulae (III) and (IV) have particularly great advantages in relation to the above-mentioned properties of good solubility in the liquid-crystalline medium, good light stability, high fluorescence and/or high anisotropy of the absorption or dichroic behaviour.

The following compounds (1) to (9) are preferred compounds of the formula (I):

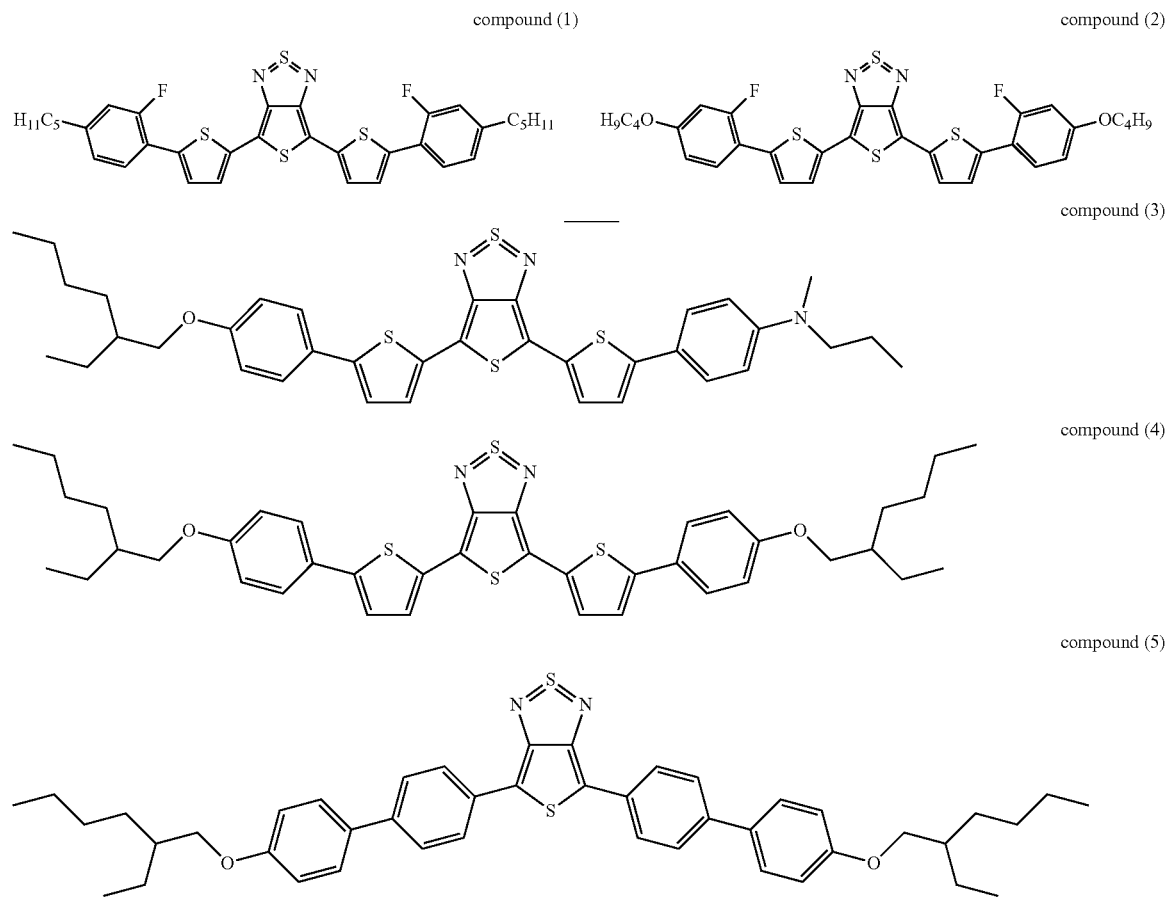

-continued

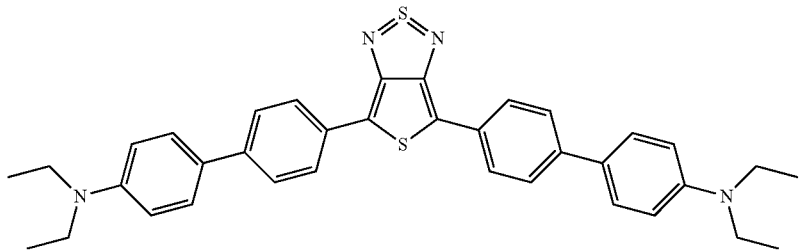
compound (6)

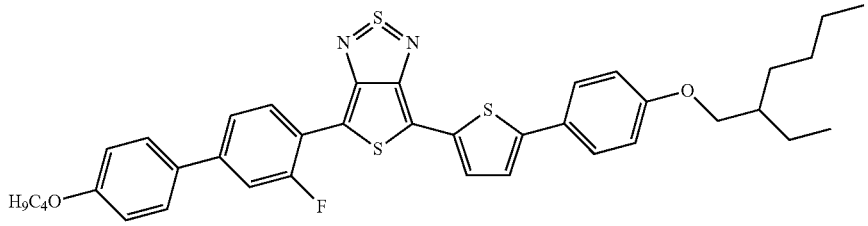
compound (7)

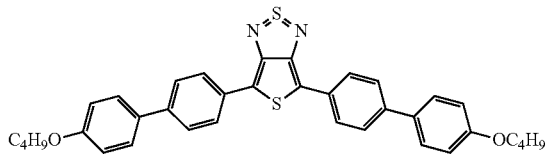
compound (8)

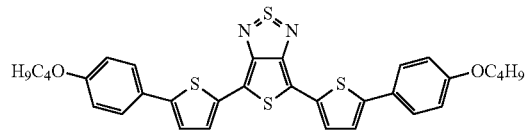
compound (9)

The invention furthermore relates to novel compounds of the formula (I):

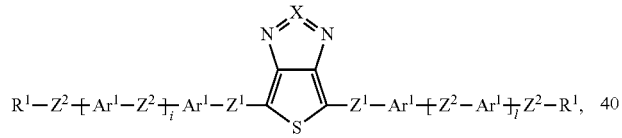
formula (I)

where:
X is equal to S or Se;
$Z^1$ is, independently of one another, a single bond, —$CR^3$=$CR^3$— or —C≡C—; or two, three, four or five groups combined with one another, selected from the groups —$CR^3$=$CR^3$— and —C≡C—;
$Z^2$ is, independently of one another, a single bond, O, S, $C(R^3)_2$, —$CR^3$=$CR^3$— or —C≡C—; or two, three, four or five groups combined with one another, selected from the groups O, S, $C(R^3)_2$, —$CR^3$=$CR^3$— and —C≡C—;
$Ar^1$ is, independently of one another, an aryl or heteroaryl group having 5 to 30 aromatic ring atoms, which may be substituted by one or more radicals $R^4$;
$R^1$ is, independently of one another, H, D, $N(R^7)_2$, or an alkyl, alkoxy or thioalkoxy group having 1 to 20 C atoms, which may be substituted by one or more radicals $R^7$, where one or more $CH_2$ groups in the alkyl, alkoxy or thioalkoxy groups may be replaced by —$R^7C$=$CR^7$—, —C≡C—, C=O, C=S, —C(=O)O—, —OC(=O)—, $Si(R^7)_2$, $NR^7$, —O— or —S—;
$R^3$, $R^4$ are, independently of one another, H, D, F, Cl, CN, or an alkyl, alkoxy or thioalkoxy group having 1 to 10 C atoms, which may be substituted by one or more radicals $R^5$, where one or more $CH_2$ groups in the alkyl, alkoxy or thioalkoxy groups may be replaced by —$R^5C$=$CR^5$—, —C≡C—, C=O, C=S, —C(=O)O—, —OC(=O)—, $Si(R^5)_2$, $NR^5$, —O— or —S—;
$R^5$ is, independently of one another, H, D, F, Cl, CN, $N(R^6)_2$, an alkyl, alkoxy or thioalkoxy group having 1 to 10 C atoms or an alkenyl or alkynyl group having 2 to 20 C atoms, where the above-mentioned groups may each be substituted by one or more radicals $R^6$ and where one or more $CH_2$ groups in the above-mentioned groups may be replaced by —$R^6C$=$CR^6$—, —C≡C—, C=O, C=S, —C(=O)O—, —O(C=O)—, $Si(R^6)_2$, $NR^6$, —O— or —S—, or an aryl or heteroaryl group having 5 to 30 aromatic ring atoms, which may in each case be substituted by one or more radicals $R^6$;
$R^6$ is, independently of one another, H, F or an aliphatic organic radical having 1 to 20 C atoms, in which one or more H atoms may be replaced by F, or an aryl or heteroaryl group having 5 to 20 C atoms, in which one or more H atoms may be replaced by F;
$R^7$ is, independently of one another, H, D, Cl, $N(R^8)_2$, an alkyl, alkoxy or thioalkoxy group having 1 to 10 C atoms or an alkenyl or alkynyl group having 2 to 20 C atoms, where the above-mentioned groups may each be substituted by one or more radicals $R^8$ and where one or more $CH_2$ groups in the above-mentioned groups may be replaced by —$R^8C$=$CR^8$—, —C≡C—, C=O, C=S, —C(=O)O—, —O(C=O)—, $Si(R^8)_2$, $NR^8$, —O— or —S—, or an aryl or heteroaryl group having 5 to 30 aromatic ring atoms, which may in each case be substituted by one or more radicals $R^8$;
$R^8$ is, independently of one another, H or an aliphatic organic radical having 1 to 20 C atoms, or an aryl or heteroaryl group having 5 to 20 C atoms; and
i is, independently of one another, equal to 0, 1, 2, 3, 4 or 5, with the proviso that a terminal group Ar$^1$—Z$^2$—Ar$^1$— in a side chain does not consist of terminal unsubstituted thiophene and diethylthiophenyl bonded thereto via a single bond. In particular, the compound is not 4,6-bis (3,4-diethyl-2,2'-bithien-5-yl)-thieno[3,4-c]-1,2,5-thiadiazole.

These compounds can be employed in the devices according to the invention and can be used in accordance with the invention. In particular embodiments, the compounds are selected as indicated above in connection with the device. The compounds here have, in particular, a structure in accordance with formula (Ia) or (Ib), or in accordance with formula (Ic), or in accordance with formulae (Ia-1) to (Ia-4) and (Ib-1) to (Ib-4), or in accordance with formula (IIa), (IIb) or (IIc), or in accordance with formula (III) or (IV). They are particularly preferably compounds (1) to (9) as shown above.

In the compounds according to the invention, the radicals R$^1$ are preferably selected, independently of one another, from H, D, N(R$^9$)$_2$, or an alkyl, alkoxy or thioalkoxy group having 1 to 20 C atoms, where one or more CH$_2$ groups in the alkyl, alkoxy or thioalkoxy groups may be replaced by —R$^5$C═CR$^5$—, —C≡C—, C═O, C═S, —C(═O)O—, —OC(═O)—, Si(R$^5$)$_2$, NR$^9$, —O— or —S—, where R$^9$ is selected, independently of one another, from H, D and alkyl having 1 to 10 C atoms. The radicals R$^1$ of the novel compounds according to the invention contain no F or —CN groups.

The invention also relates to an electrochemical device comprising at least one of the novel compounds according to the invention. The invention also relates to the use of an electrochemical device of this type, or of the novel compounds, in a window, in particular a switchable window, in organic solar cells, for example as semiconductor (donor or acceptor) or as sensitiser; in organic electronic components, in particular semiconductors, such as field-effect transistors, diodes or OLEDs, for tinting a polymer matrix, for example in the automobile sector, or generally as a constituent of liquid-crystalline mixtures.

The compounds of the formula (I) described above can be prepared by fundamentally known processes of organic chemistry, in particular by Suzuki coupling between organic bromides and organic boronic acids, or by Stille coupling via the tributylstannyl derivatives. Particularly suitable processes are shown below in general form. For specific processes for the preparation of compounds of the formula (I), reference is furthermore made to the known literature and to the working examples.

A possible, preferred process for the preparation of compounds of the formula (I) is based on a thienothiadiazole derivative which carries two bromine or chlorine substituents. Compounds of the formula (I) can be prepared therefrom by Suzuki coupling to suitable boronic acid derivatives, as shown by Schemes 1 and 2 below.

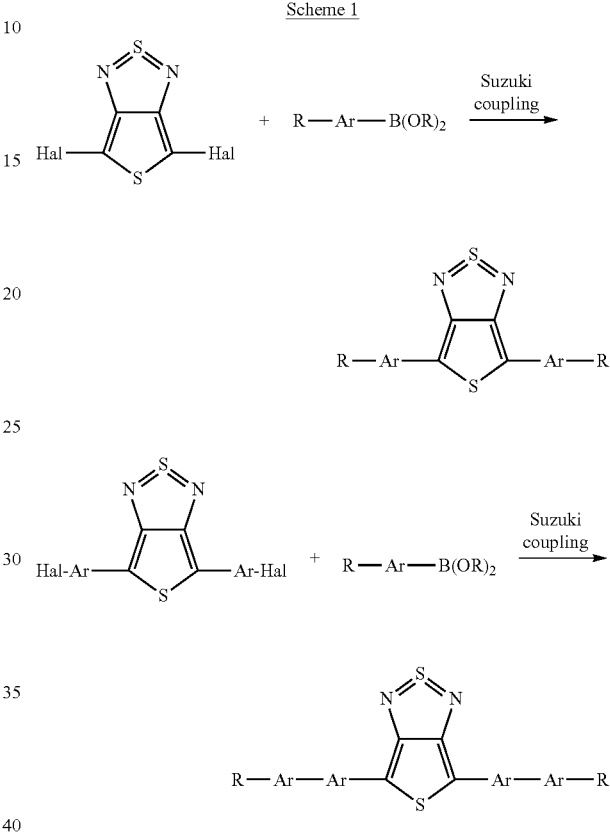

The following general synthesis schemes 2 to 5 show by way of example how compounds of the formula (I) can be prepared. The synthesis starts from building block 5, whose preparation is described in the literature (Li et al., Dyes Pigm. 2011, 92, 674-680).

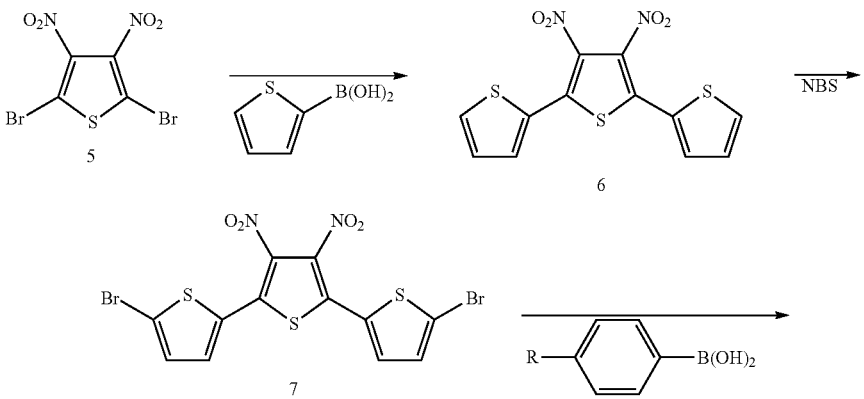

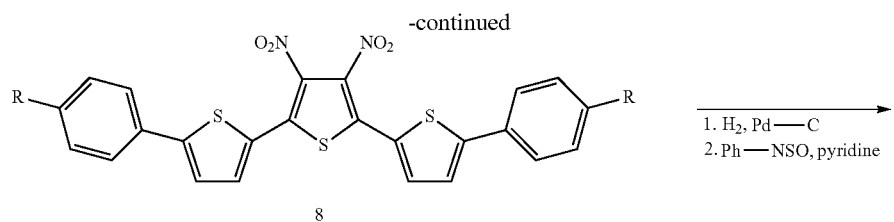
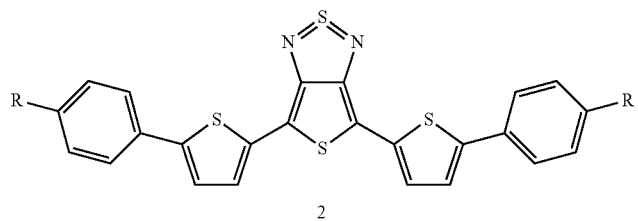
Scheme 3:
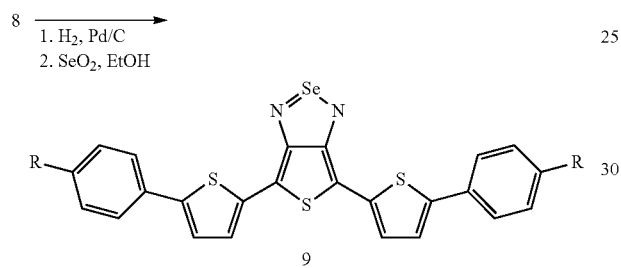
Scheme 4:
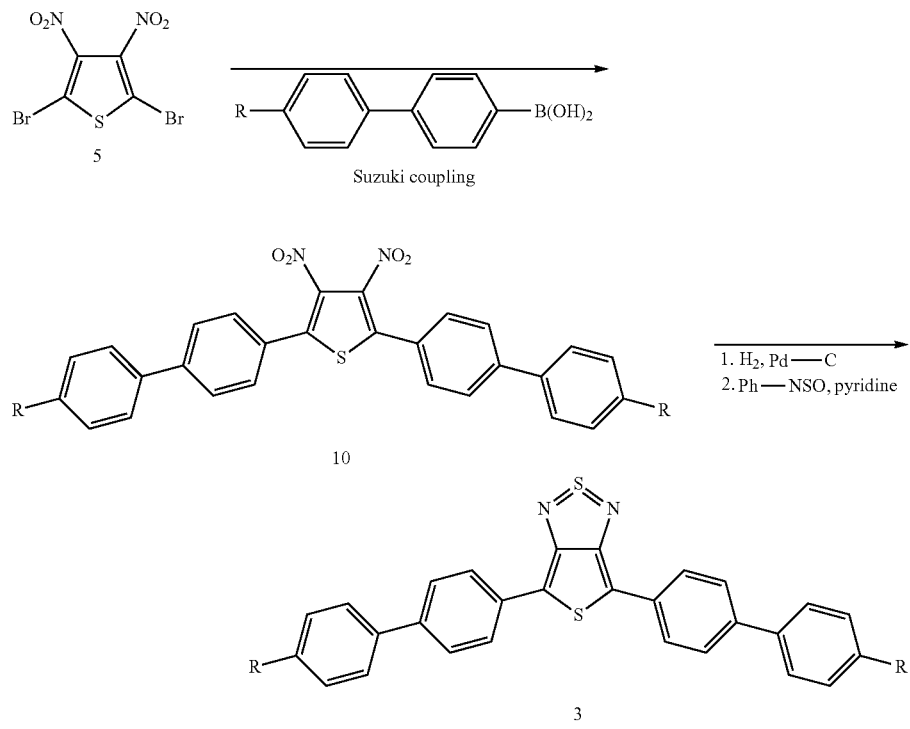

Scheme 5:

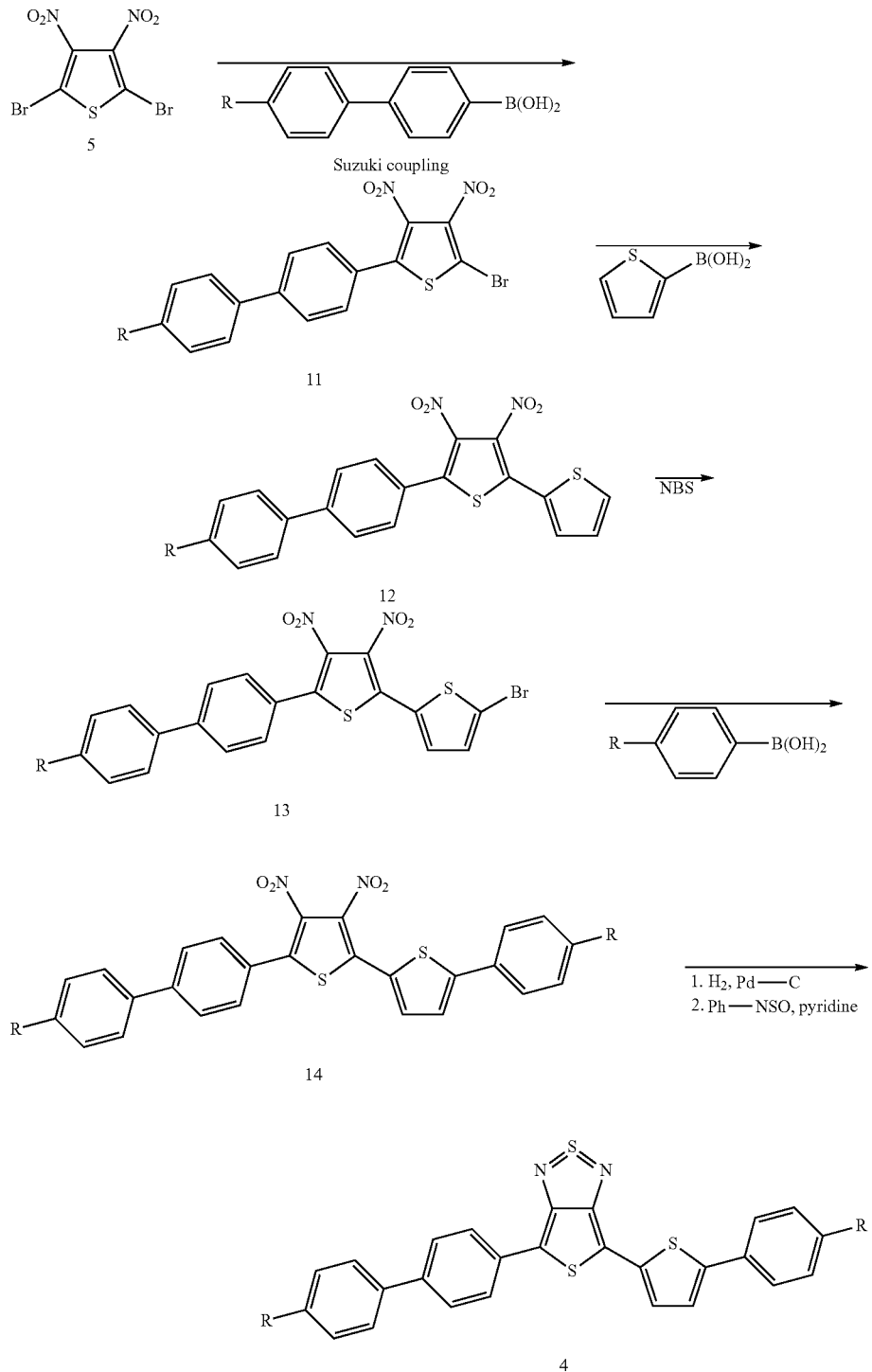

Syntheses of aromatic-substituted thienothiadiazoles are also described in WO2010/031479A1 and WO2013/102038. Reference is expressly made here to the synthetic processes described therein.

The compound of the formula (I) is preferably a dye having positive dichroism, i.e. a dye which has a positive degree of anisotropy R, determined as indicated in the working examples. The degree of anisotropy R is particularly preferably greater than 0.4, very particularly preferably greater than 0.6 and most preferably greater than 0.7, where R is determined as indicated in the working examples.

The absorption preferably reaches a maximum when the polarisation direction of the light is parallel to the direction of the longest elongation of the molecule of the formula (I), and it reaches a minimum when the polarisation direction of the light is perpendicular to the direction of the longest elongation of the molecule of the formula (I).

The compounds of the formula (I) generally have good absorption above 580 nm. They preferably have an absorption band above 580 nm. The longest-wave absorption is preferably >580 nm.

The compound of the formula (I) is furthermore preferably a fluorescent dye. Fluorescence here is taken to mean that a compound is placed in an electronically excited state by absorption of light of a certain wavelength, where the compound subsequently undergoes a transition into the ground state with emission of light. The emitted light preferably has a longer wavelength than the absorbed light. The transition from the excited state into the ground state is furthermore preferably spin-allowed, i.e. takes place without a change in the spin. Furthermore preferably, the lifetime of the excited state of the fluorescent compound is shorter than $10^{-5}$ s, particularly preferably shorter than $10^{-6}$ s, very particularly preferably between $10^{-9}$ and $10^{-7}$ s.

The compounds of the formula (I) have advantages over the prior art and thus achieve the object on which the invention is based. The compounds exhibit extreme light fastness, for example compared with perylenediimide derivatives, in solution in a liquid-crystalline host. In addition, they exhibit long-wave absorption, and high dichroism in combination with very good solubility. A particular advantage is also the possibility of adjusting the absorption and emission maxima to their respective requirements by variation of the electron-donor properties of the side chains.

An essential advantage is the position of the fluorescence emission maximum beyond the sensitivity range of the human eye. In applications such as, for example, switchable windows based on liquid-crystalline guest-host systems, this enables utilisation of the emitted radiation for the electricity supply of energy self-sufficient systems with the aid of solar cells without the fluorescence light, which is invisible to the eye, resulting in irritating interfering effects in such window systems.

The dichroic compound of the formula (I) is preferably present in the switching layer in a proportion of 0.01 to 10% by weight, particularly preferably 0.05 to 7% by weight and very particularly preferably 0.1 to 7% by weight.

Besides the compound of the formula (I), a liquid-crystalline medium comprising one or more different compounds is preferably present in the switching layer. The liquid-crystalline medium preferably represents the principal component of the mixture of the switching layer of the device according to the invention. The dichroic compound of the formula (I) is preferably in the form of a solution in the switching layer. It is preferably influenced in its alignment by the alignment of the compounds of the liquid-crystalline medium.

For the purposes of the present application, the term liquid-crystalline medium is taken to mean a material which has liquid-crystalline properties under certain conditions. The material preferably has liquid-crystalline properties at room temperature and in a certain temperature range above and below room temperature. The liquid-crystalline medium may comprise a single compound, or it may comprise a plurality of different compounds. The liquid-crystalline medium in accordance with the invention typically comprises at least one compound whose molecules have an elongated shape, i.e. are significantly longer in one spatial direction (longitudinal axis) than in the other two spatial directions.

The invention furthermore relates to the use of a mixture comprising a liquid-crystalline medium and at least one compound of a formula (I) in a device for regulating the passage of energy from an outside space into an inside space.

The liquid-crystalline medium of the switching layer preferably has a clearing point, preferably a phase transition from a nematic liquid-crystalline state to an isotropic state, in the temperature range from 70° C. to 170° C., preferably from 90° C. to 160° C., particularly preferably from 95° C. to 150° C. and very particularly preferably from 105° C. to 140° C.

Furthermore, the dielectric anisotropy of the liquid-crystalline medium of the switching layer is preferably greater than 3, particularly preferably greater than 7.

In a further preferred embodiment, the dielectric anisotropy of the liquid-crystalline medium of the switching layer is less than zero, preferably less than −2.

The liquid-crystalline medium of the switching layer furthermore preferably has an optical anisotropy (Δn) of 0.01 to 0.3, particularly preferably of 0.04 to 0.27.

The liquid-crystalline medium of the switching layer furthermore preferably comprises 3 to 20 different liquid-crystalline compounds, preferably 8 to 18, particularly preferably 12 to 16 different liquid-crystalline compounds.

Compounds which can be used as constituents of the liquid-crystalline medium are known to the person skilled in the art and can be selected freely.

It is preferred for the liquid-crystalline medium of the switching layer to comprise at least one compound which contains structural elements based on 1,4-phenylenes and 1,4-cyclohexylenes which are substituted by one or more fluorine atoms or one or more nitrile groups. It is particularly preferred for the liquid-crystalline medium of the switching layer to comprise at least one compound which contains 2, 3 or 4, particularly preferably 3 or 4 structural elements based on 1,4-phenylenes and 1,4-cyclohexylenes.

It is furthermore preferred for the liquid-crystalline medium of the switching layer to comprise one or more chiral dopants. In this case, the molecules of the liquid-crystalline medium are preferably twisted with respect to one another in the switching layer of the device, particularly preferably as known from the TN mode of displays.

Chiral dopants are preferably used in the liquid-crystalline medium of the switching layer in a total concentration of 0.01 to 3% by weight, particularly preferably 0.05 to 1% by weight. In order to obtain high values for the twist, the total concentration of the chiral dopants may also be selected higher than 3% by weight, preferably up to a maximum of 10% by weight.

According to an alternative, likewise preferred embodiment, the liquid-crystalline medium of the switching layer comprises no chiral dopants. In this case, the molecules of the liquid-crystalline medium are preferably not twisted with respect to one another in the switching layer of the device.

The proportions of these compounds and other components present in small amounts are neglected when specifying the proportions of the liquid-crystalline compounds and the dichroic dyes.

The liquid-crystalline medium of the switching layer furthermore preferably comprises one or more stabilisers. The total concentration of the stabilisers is preferably between 0.00001 and 10% by weight, particularly preferably between 0.0001 and 1% by weight of the entire mixture. The proportions of these compounds and other components present in small amounts are neglected when specifying the proportions of the liquid-crystalline compounds and the dichroic dyes.

In addition to one or more compounds of the formula (I), and preferably a liquid-crystalline medium, the device according to the invention preferably also comprises further dichroic dyes having a different structure to formula (I) in the switching layer. It particularly preferably comprises one, two, three or four further dyes, very particularly preferably two or three further dyes and most preferably three further dyes having a different structure to formula (I).

With respect to the property of dichroism, the preferred properties described for the compound of the formula (I) are also preferred for the optional further dichroic dyes.

The absorption spectra of the dichroic dyes of the switching layer preferably complement one another in such a way that the impression of a black colour arises for the eye. The two or more dichroic dyes of the liquid-crystalline medium according to the invention preferably cover a large part of the visible spectrum. The precise way in which a mixture of dyes which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, Verlag Walter de Gruyter & Co.

The setting of the colour location of a mixture of dyes is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables (for example reference above). Different colour locations can be set by changing the proportions of the various dyes.

According to a preferred embodiment, the switching layer, in addition to the at least one compound of the formula (I), comprises one or more dichroic dyes which absorb light in the red and NIR region, i.e. at a wavelength of 600 to 2000 nm, preferably in the range from 650 to 1800 nm, particularly preferably in the range from 650 to 1300 nm. In a preferred embodiment, these dichroic dyes are selected from azo compounds, anthraquinones, methine compounds, azomethine compounds, merocyanine compounds, naphthoquinones, tetrazines, perylenes, terrylenes, quaterrylenes, higher rylenes, pyrromethenes, azo dyes, nickel dithiolenes, (metal) phthalocyanines, (metal) naphthalocyanines and (metal) porphyrins. Of these, particular preference is given to perylenes and terrylenes.

The proportion of all dichroic dyes in the mixture of the switching layer is preferably in total 0.01 to 10% by weight, particularly preferably 0.1 to 7% by weight and very particularly preferably 0.2 to 7% by weight.

The additional dichroic dyes of the switching layer which do not conform to the formula (I) are furthermore preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

The said dyes which do not conform to the formula (I) belong to the classes of dichroic dyes which are known to the person skilled in the art and have been described many times in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Lig. Cryst. 39, 39-52 (1977), and H. Seki, C. Shishido, S. Yasui and T. Uchida: Jpn. J. Appl. Phys. 21, 191-192 (1982), and perylenes are described in EP 60895, EP 68427 and WO 82/1191. Rylene dyes as described, for example, in EP 2166040, US 2011/0042651, EP 68427, EP 47027, EP 60895, DE 3110960 and EP 698649.

According to a preferred embodiment, the switching layer of the device according to the invention comprises, besides compounds of the formula (I), exclusively dichroic dyes selected from rylene dyes.

Examples of preferred further dichroic dyes which do not conform to formula (I) and which may be present in the switching layer of the device according to the invention are depicted in the following table:

TABLE 2

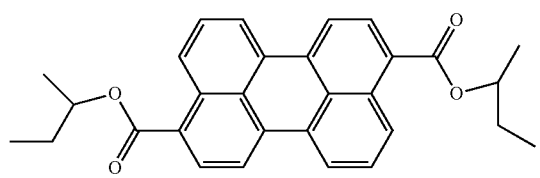 [SMILES: CCC(C)OC(=O)c1ccc2c3cccc4c(C(=O)OC(C)CC)ccc(c5cccc1c52)c43]

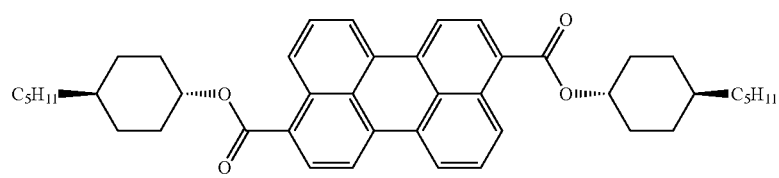

TABLE 2-continued
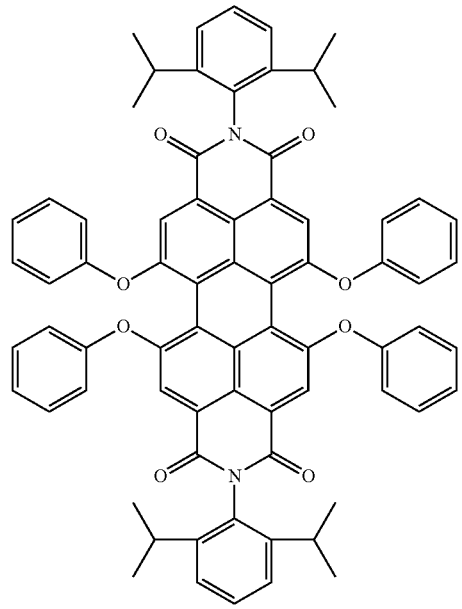 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]
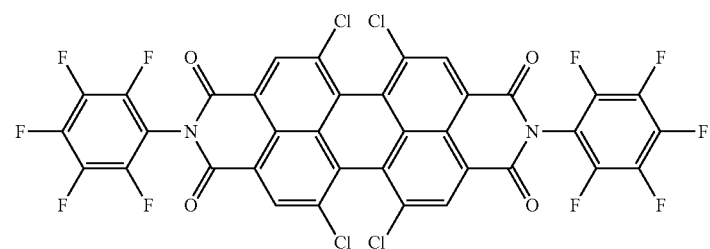 [SMILES: O=C1c2cc(Cl)c3c4c(Cl)cc5c6c(cc(Cl)c(c7c(Cl)cc(c2c37)C(=O)N1c1c(F)c(F)c(F)c(F)c1F)c64)C(=O)N(c1c(F)c(F)c(F)c(F)c1F)C5=O]
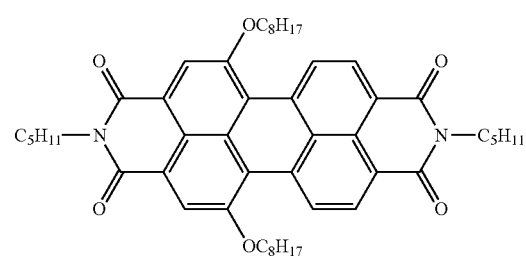
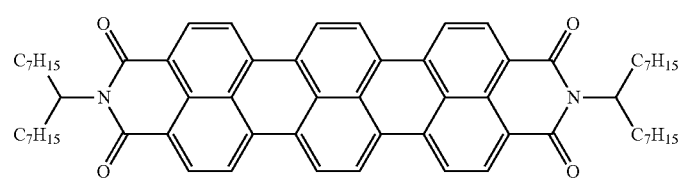

TABLE 2-continued
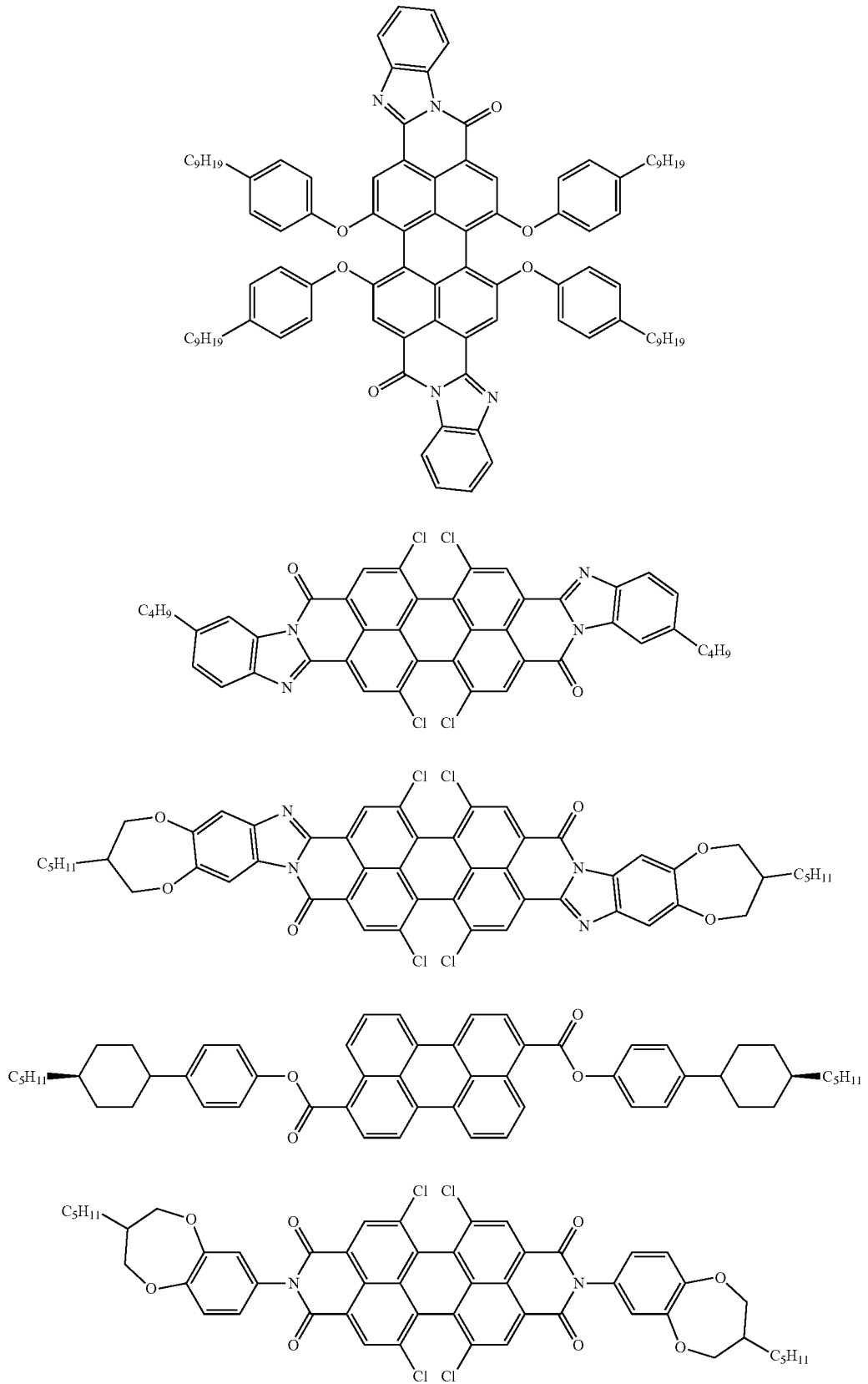

TABLE 2-continued
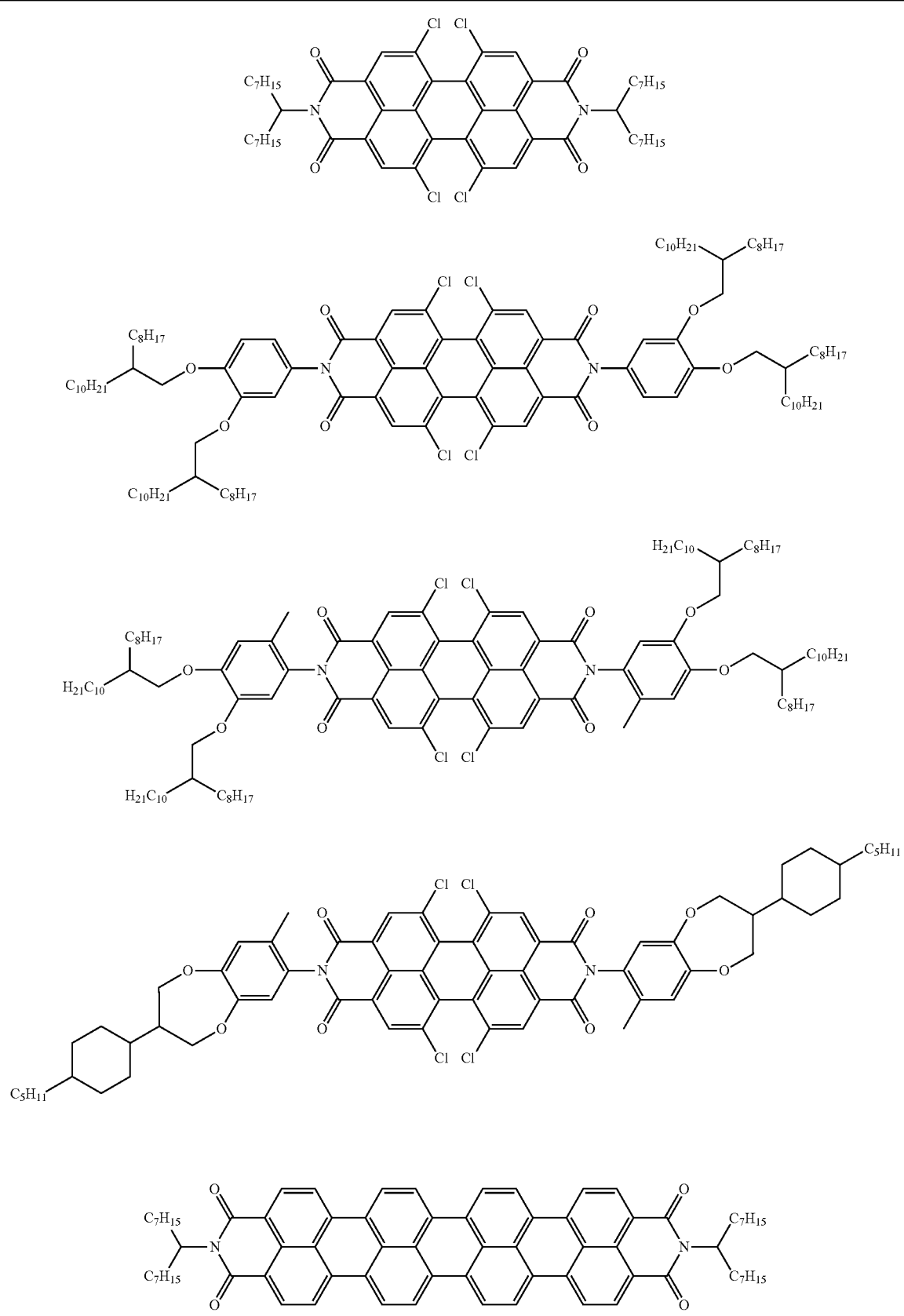

TABLE 2-continued
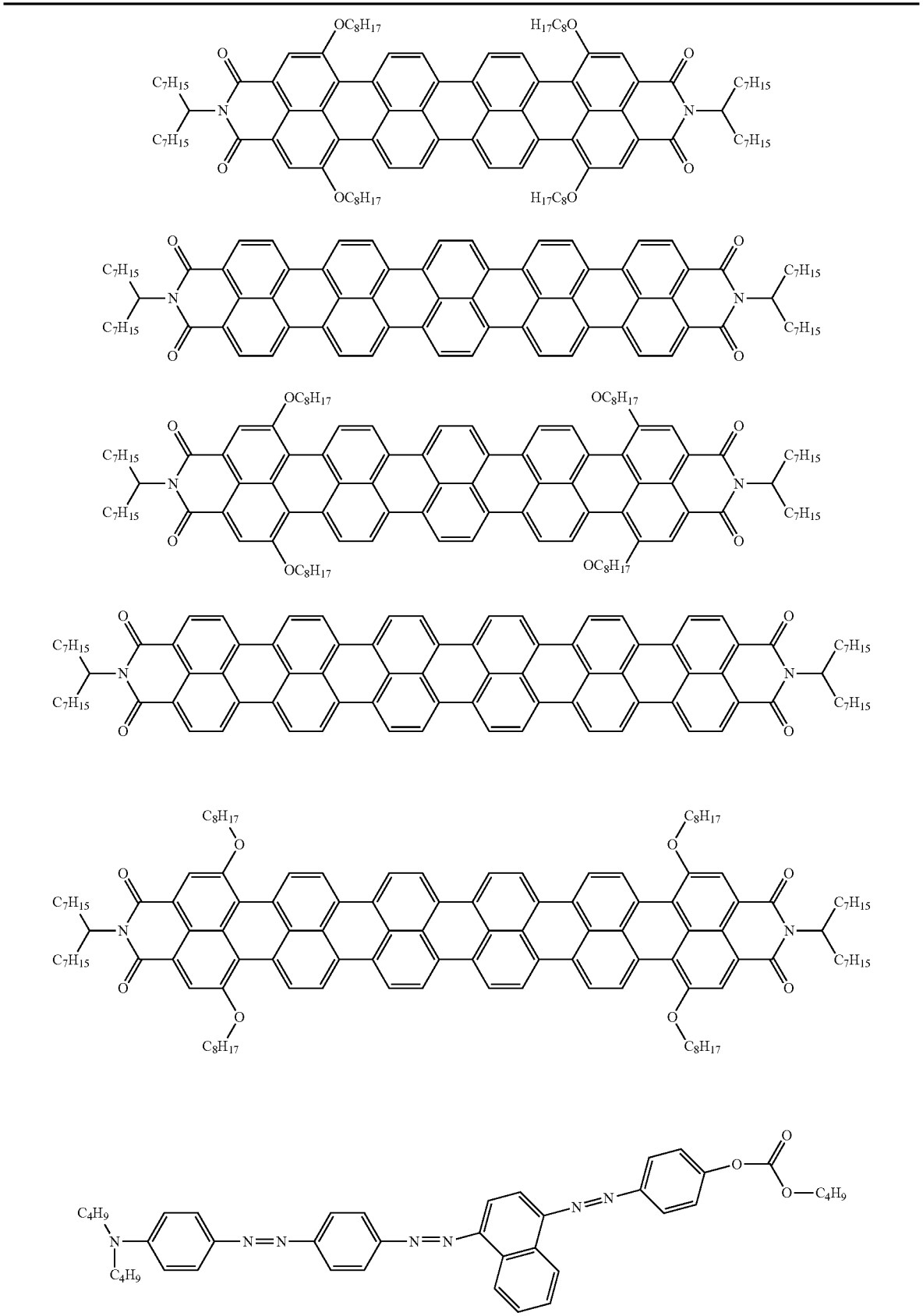

TABLE 2-continued

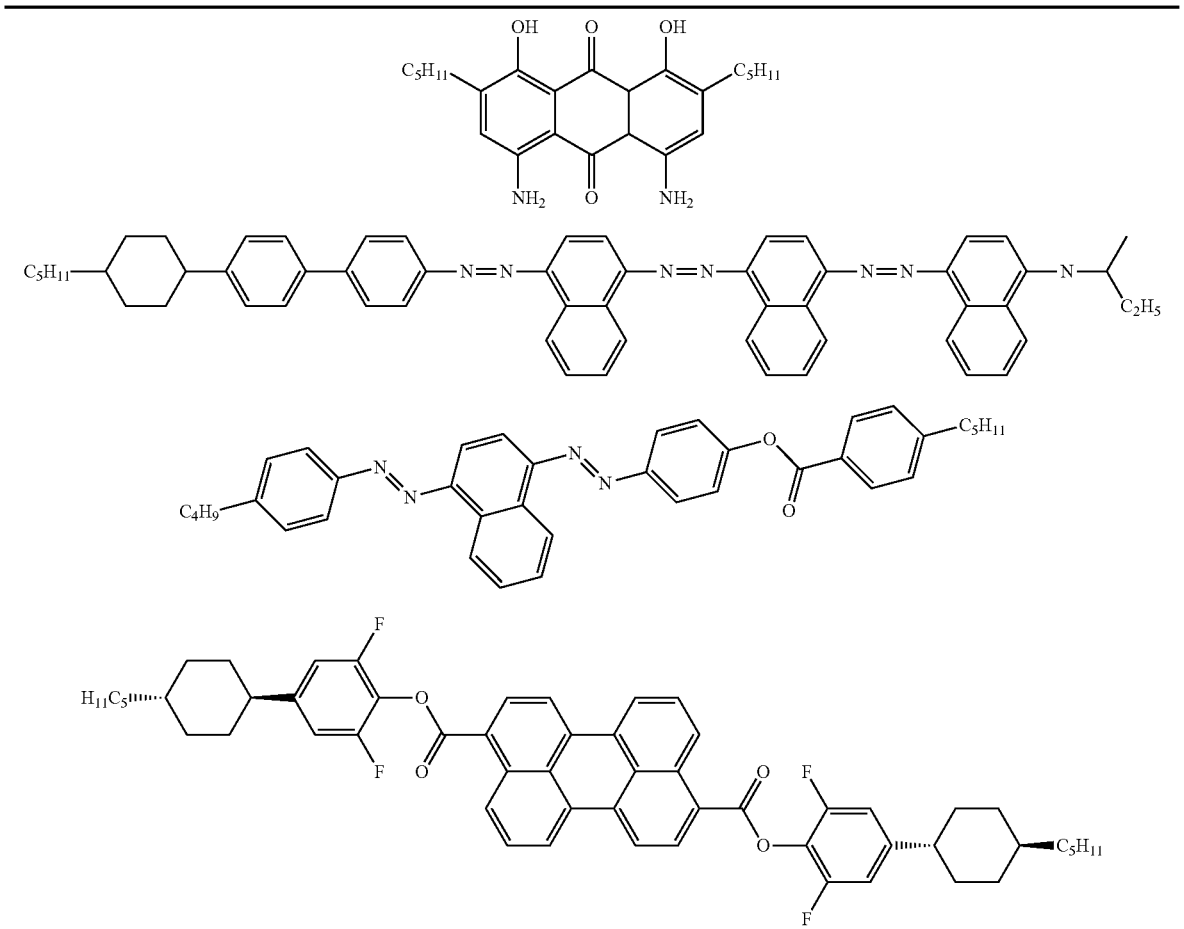

In a preferred embodiment, the switching layer of the device according to the invention comprises one or more quencher compounds. This is particularly preferred if the device according to the invention comprises one or more fluorescent dyes in its switching layer.

Quencher compounds are compounds which quench the fluorescence. The quencher compounds can take on the electronic excitation energy of adjacent molecules, such as, for example, fluorescent dyes, in the switching layer and undergo a transition into an electronically excited state in the process. The quenched fluorescent dye is thus converted into the electronic ground state and is thus prevented from emitting fluorescence or undergoing a subsequent reaction. The quencher compound itself returns to the ground state through radiation-free deactivation or by emission of light and is again available for further quenching.

The quencher compound may have various functions in the switching layer of the device according to the invention. Firstly, the quencher compound may contribute to extending the lifetime of a dye system, by deactivation of electronic excitation energy. Secondly, the quencher compound eliminates additional colour effects which may be aesthetically undesired, for example coloured emission in the inside space emanating from the fluorescent dyes in the switching layer.

In order to achieve effective quenching, the quencher compound should be adapted to the respective dye system, in particular the dye absorbing at the longest wavelength in a dye combination. The way to do this is known to the person skilled in the art.

Preferred quencher compounds are described, for example, in Table 8.1 on page 279 in Joseph R. Lakowicz, Principles of Fluorescence Spectroscopy, $3^{rd}$ Edition, 2010, ISBN 10: 0-387-31278-1, Verlag Springer Science+Business Media LLC. Further classes of molecule are familiar to the person skilled in the art, for example under the key words dark quencher or black hole quencher. Examples are azo dyes and aminoanthraquinones. The quencher compounds used in the switching layer of the device according to the invention may also be non-fluorescent dyes or dyes which only fluoresce in the NIR.

In a preferred embodiment of the switching layer according to the invention, any quencher compounds present are selected so that fluorescence in the visible part of the spectrum is suppressed.

The device according to the invention is preferably suitable for regulating the passage of energy in the form of light emitted by the sun from the environment into an inside space. The passage of energy to be regulated here takes place from the environment (the outside space) into an inside space.

The inside space here can be any desired space that is substantially sealed off from the environment, for example a building, a vehicle or a container.

The invention therefore furthermore relates to the use of the device for regulating the passage of energy from an outside space into an inside space.

However, the device can also be employed for aesthetic room design, for example for light and colour effects. For example, door and wall elements containing the device according to the invention in grey or in colour can be switched to transparent. Furthermore, the device may also comprise white or coloured flat backlighting which is modulated in brightness or yellow flat backlighting which is modulated in colour by means of a blue guest-host display. One or both glass sides of the device according to the invention may be provided with roughened or structured glass for the coupling-out of light and/or for the generation of light effects.

In a further alternative use, the device is employed for regulating the incidence of light on the eyes, for example in protective goggles, visors or sunglasses, where the device keeps the incidence of light on the eyes low in one switching state and reduces the incidence of light less in another switching state.

The device according to the invention is preferably arranged in an opening in a relatively large two-dimensional structure, where the two-dimensional structure itself only allows slight passage of energy, or none at all, and where the opening has relatively high energy transmissivity. The two-dimensional structure is preferably a wall or another boundary of an inside space to the outside. Furthermore, the two-dimensional structure preferably covers an area of at least equal size, particularly preferably an area at least twice as large as the opening in it in which the device according to the invention is arranged.

The device is preferably characterised in that it has an area of at least 0.05 m$^2$, preferably at least 0.1 m$^2$, particularly preferably at least 0.5 m$^2$ and very particularly preferably at least 0.8 m$^2$.

The device is preferably accommodated in an opening having relatively high energy transmissivity, as described above, in a building, a container, a vehicle or another substantially closed space. The device can generally be used for any desired inside spaces, particularly if they have only limited exchange of air with the environment and have light-transmitting boundary surfaces through which input of energy from the outside in the form of light energy can take place. The use of the device for inside spaces which are subjected to strong insolation through light-transmitting areas, for example through window areas, is particularly relevant.

The device according to the invention is switchable. Switching here is taken to mean a change in the passage of energy through the device. The device according to the invention is preferably electrically switchable, as described, for example, in WO 2009/141295 and in the as yet unpublished application EP 12008320.9.

However, it may also be thermally switchable, as described, for example, in WO 2010/118422. In this case, the switching preferably takes place through a transition from a nematic state to an isotropic state through a change in the temperature of the switching layer comprising the compound of the formula (I) and a liquid-crystalline medium. In the nematic state, the molecules of the liquid-crystalline medium are in ordered form and thus so is the compound of the formula (I), for example aligned parallel to the surface of the device through the action of an alignment layer. In the isotropic state, the molecules are in unordered form, and thus so is the compound of the formula (I). The difference between ordered and unordered presence of the dichroic compound of the formula (I) causes a difference in the light transmissivity of the switching layer of the device according to the invention, in accordance with the principle that dichroic compounds have a higher or lower absorption coefficient depending on the alignment in relation to the plane of vibration of the light.

If the device is electrically switchable, it preferably comprises two or more electrodes, which are installed on both sides of the switching layer. The electrodes preferably consist of ITO or a thin, preferably transparent metal and/or metal-oxide layer, for example silver or FTO (fluorine-doped tin oxide) or an alternative material known to the person skilled in the art for this use. The electrodes are preferably provided with electrical connections. The voltage is preferably provided by a battery, a rechargeable battery or an external power supply.

The switching operation in the case of electrical switching takes place through an alignment of the molecules of the liquid-crystalline medium by the application of voltage.

In a preferred embodiment, the device is converted from a state having high absorption, i.e. low light transmissivity, which is present without voltage, into a state having lower absorption, i.e. higher light transmissivity. The liquid-crystalline medium of the switching layer is preferably nematic in both states. The voltage-free state is preferably characterised in that the molecules of the liquid-crystalline medium, and thus the molecules of the compound of the formula (I), are aligned parallel to the plane of the switching layer. This is preferably achieved by a correspondingly selected alignment layer. The state under voltage is preferably characterised in that the molecules of the liquid-crystalline medium, and thus the molecules of the compound of the formula (I), are perpendicular to the plane of the switching layer.

In an alternative embodiment to the embodiment mentioned above, the device is converted from a state having low absorption, i.e. high light transmissivity, which is present without voltage, into a state having higher absorption, i.e. lower light transmissivity. The liquid-crystalline medium of the switching layer is preferably nematic in both states. The voltage-free state is preferably characterised in that the molecules of the liquid-crystalline medium of the switching layer, and thus the molecules of the compound of the formula (I), are aligned perpendicular to the plane of the switching layer. This is preferably achieved by a correspondingly selected alignment layer. The state under voltage is preferably characterised in that the molecules of the liquid-crystalline medium of the switching layer, and thus the molecules of the compound of the formula (I), are parallel to the plane of the switching layer.

According to a preferred embodiment of the invention, the device can be operated without an external power supply by providing the energy required by means of a solar cell or another device for conversion of light and/or heat energy into electrical energy which is connected to the device. The provision of the energy by means of the solar cell can take place directly or indirectly, i.e. via a battery or rechargeable battery or other unit for the storage of energy connected in-between. The solar cell is preferably mounted on the outside of the device or is an internal component of the device, as disclosed, for example, in WO 2009/141295. Particular preference is given here to solar cells which are particularly efficient in the case of diffuse light, and transparent solar cells.

The device according to the invention preferably has the following layer sequence, where further layers may additionally be present. The layers indicated below are preferably directly adjacent to one another in the device:
   substrate layer, preferably comprising glass or polymer
   electrically conductive transparent layer, preferably comprising ITO alignment layer
switching layer comprising one or more compounds of the formula (I)
alignment layer
electrically conductive transparent layer, preferably comprising ITO
substrate layer, preferably comprising glass or polymer The preferred embodiments of the individual layers are described below.

The device according to the invention preferably comprises one or more, particularly preferably two, alignment layers. The alignment layers are preferably directly adjacent to the two sides of the switching layer comprising the compound of the formula (I).

The alignment layers used in the device according to the invention can be any desired layers known to the person skilled in the art for this purpose. Preference is given to polyimide layers, particularly preferably layers comprising rubbed polyimide. Polyimide rubbed in a certain manner known to the person skilled in the art results in alignment of the molecules of the liquid-crystalline medium in the rubbing direction if the molecules are parallel to the alignment layer (planar alignment). It is preferred here for the molecules of the liquid-crystalline medium not to be completely planar on the alignment layer, but instead to have a slight pretilt angle. In order to achieve vertical alignment of the compounds of the liquid-crystalline medium to the surface of the alignment layer (homeotropic alignment), polyimide treated in a certain manner is preferably employed as material for the alignment layer (polyimide for very high pretilt angles). Furthermore, polymers obtained by an exposure process to polarised light can be used as alignment layer in order to achieve alignment of the compounds of the liquid-crystalline medium in accordance with an alignment axis (photo-alignment).

The switching layer in the device according to the invention is furthermore preferably arranged between two substrate layers or enclosed thereby. The substrate layers can consist, for example, of glass or a polymer, preferably a light-transmitting polymer.

The device is preferably characterised in that it does not comprise a polymer-based polariser, particularly preferably does not comprise a polariser in the solid material phase and very particularly preferably comprises no polariser at all.

However, in accordance with an alternative embodiment, the device may also comprise one or more polarisers. The polarisers in this case are preferably linear polarisers.

If precisely one polariser is present, its absorption direction is preferably perpendicular to the orientation axis of the compounds of the liquid-crystalline medium of the device according to the invention on the side of the switching layer on which the polariser is located.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

The device according to the invention furthermore preferably comprises an optical waveguide system which transports the light to a solar cell or another device for the conversion of light and/or heat energy into electrical energy, preferably as described in WO 2009/141295. The optical waveguide system collects and concentrates light hitting the device. It preferably collects and concentrates light emitted by fluorescent dichroic dyes in the switching layer. The optical waveguide system is in contact with a device for the conversion of light energy into electrical energy, preferably a solar cell, so that the collected light hits the latter in concentrated form. In a preferred embodiment of the invention, the device for the conversion of light energy into electrical energy is mounted at the edge of the device, integrated into the latter and electrically connected to means for the electrical switching of the device according to the invention.

In a preferred embodiment, the device according to the invention is a constituent of a window, particularly preferably a window comprising at least one glass surface, very particularly preferably a window which comprises multipane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass surface of a window, particularly preferably in the interspace between two glass panes of multipane insulating glass.

The invention furthermore relates to a window comprising a device according to the invention, preferably having the preferred features indicated above.

WORKING EXAMPLES

The following examples are intended to illustrate the present invention and should not be interpreted as restrictive.

In the present application, structures of liquid-crystalline compounds are reproduced by means of abbreviations (acronyms). These abbreviations are explicitly presented and explained in WO 2012/052100 (pp. 63-89).

All physical properties are determined in accordance with "Merck Liquid Crystals, Physical Properties of Liquid Crystals", Status November 1997, Merck KGaA, Germany, and apply for a temperature of 20° C. The value of $\Delta n$ is determined at 589 nm, and the value of $\Delta\varepsilon$ is determined at 1 kHz, unless explicitly indicated otherwise in each case. $n_e$ and $n_o$ are in each case the refractive indices of the extraordinary and ordinary light beam under the conditions indicated above.

The degree of anisotropy R is determined from the value for the extinction coefficient $E(p)$ (extinction coefficient of the mixture in the case of parallel alignment of the molecules to the polarisation direction of the light) and the value for the extinction coefficient of the mixture $E(s)$ (extinction coefficient of the mixture in the case of perpendicular alignment of the molecules to the polarisation direction of the light), in each case at the wavelength of the maximum of the absorption band of the dye in question. If the dye has a plurality of absorption bands, the strongest absorption band is selected.

The alignment of the molecules of the mixture is achieved by an alignment layer, as known to the person skilled in the art in the area of LC display technology. In order to eliminate influences by liquid-crystalline medium, other absorptions and/or reflections, each measurement is carried out against an identical mixture comprising no dye, and the value obtained is subtracted.

The measurement is carried out using linear-polarised light whose vibration direction is either parallel to the alignment direction (determination of E(p)) or perpendicular to the alignment direction (determination of E(s)). This can be achieved by a linear polariser, where the polariser is rotated with respect to the device in order to achieve the two different vibration directions. The measurement of E(p) and E(s) is thus carried out via the rotation of the vibration direction of the incident polarised light.

The degree of anisotropy R is calculated from the resultant values for E(s) and E(p) in accordance with the formula $$R=[E(p)-E(s)]/[E(p)+2*E(s)],$$

as indicated, inter alia, in "Polarized Light in Optics and Spectroscopy", D. S. Kliger et al., Academic Press, 1990. A detailed description of the method for the determination of the degree of anisotropy of liquid-crystalline media comprising a dichroic dye is also given in B. Bahadur, Liquid Crystals—Applications and Uses, Vol. 3, 1992, World Scientific Publishing, Section 11.4.2.

The quantity $\varepsilon_{iso}$ is calculated as follows:

$$\varepsilon_{iso}=[E(p)+2*E(s)]/c/d,$$

where the concentration c is selected in % and the cell thickness d is selected in cm.

A) Preparation of the Dyes

Compound V-5 is prepared in a synthetic process in accordance with the following Working Examples A-1 to A-5.

A-1) Synthesis of Compound V-1

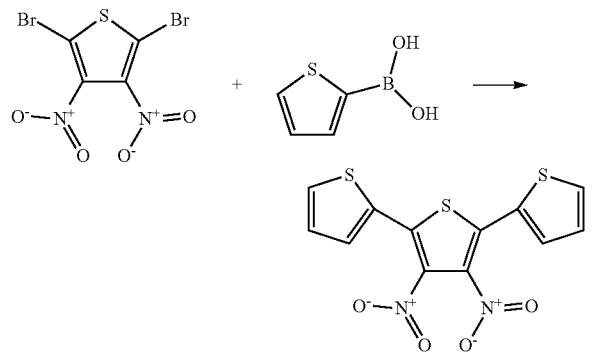

The metaborate is initially introduced in water, dibromide, THF, catalyst and hydrazine are added, and the mixture is stirred for 30 sec. The boronic acid is then added, and the mixture is heated to the boiling point (65° C.) and refluxed overnight. According to the thin-layer chromatogram TLC (heptane/EA 9:1), everything has reacted. The mixture is cooled, water and MTB ether are added, and the phases are separated. The aqueous phase is then extracted 6× with MTB ether (methyl tert-butyl ether), and the combined org. phases are washed 2× with water and 1× with sat. NaCl soln. and dried over sodium sulfate. Poor phase separation (black/black) is observed. The mixture is then evaporated to dryness. The residue is eluted over 200 ml of silica gel with heptane/toluene 1:1 (yield: 6.3 g, dark brown, solid; HPLC: 52.2%). The product is crystallised from 40 ml of toluene at −20° C. (3.56 g of ochre powder; HPLC: 91.7%).

The following tables summarise the starting materials employed, the product and the amounts employed and obtained.

| Name | Amount | M | Moles | Equiv. |
|---|---|---|---|---|
| 2,5-Dibromo-3,4-dinitrothiophene | 13.200 g | 331.928 | 39.768 mmol | 1.0 |
| Thiophene-2-boronic acid | 11.195 g | 127.958 | 87.489 mmol | 2.2 |
| Sodium metaborate tetrahydrate | 21.929 g | 137.860 | 0.159 mol | 4.0 |
| Bis(triphenylphosphine)palladium(II) chloride (15.2% of Pd) for synthesis | 1.117 g | 701.907 | 1.591 mmol | 0.0 |
| Tetrahydrofuran for analysis ACS | 300.000 ml | 72.106 | 3.703 mol | 93.1 |
| Hydrazinium hydroxide (about 80% of N₂H₅OH) for synthesis | 0.135 ml | 50.060 | 2.784 mmol | 0.1 |
| DI water | 120.000 g | 18.020 | 6.659 mol | 167.5 |

| Product | Amount | M | Content | Moles | Yield % | Th. yield |
|---|---|---|---|---|---|---|
| 3',4'-Dinitro-[2,2';5',2'']-terthiophene | 3.560 g | 338.385 | 91.7% | 0.01 mol | 24.3 | 13.5 g |

A-2) Synthesis of Compound V-2

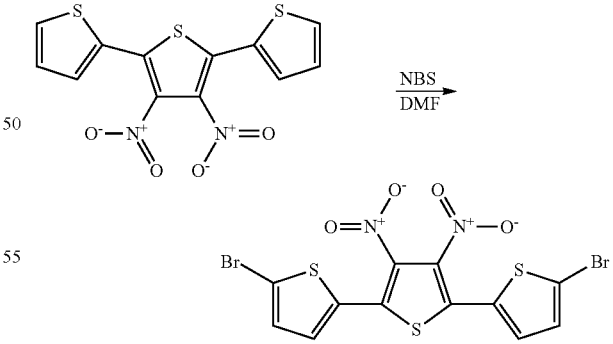

Compound V-1, as prepared in accordance with Example A-1), is initially introduced in DMF under nitrogen, NBS is added with stirring, and the reaction mixture is heated to 90° C. and stirred at this temperature overnight. The reaction is carried out using an apparatus comprising 100 ml three-necked flask, magnetic stirrer, condenser, nitrogen inlet, thermometer and heating mantle.

The preparation of the novel product is evident in the TLC. Water is added to the still-warm product batch. The reaction mixture changes colour from red to dark brown. The mixture is subsequently cooled to 0° C., and crystals which have precipitated out are filtered off with suction, giving, as residue, 4.52 g of orange-brown powder (compound V-2; HPLC: 82.3%).

The following tables summarise the starting materials employed, the product and the amounts employed and obtained.

| Name | Amount | M | Moles | Equiv. |
|---|---|---|---|---|
| 3',4'-Dinitro-[2,2';5',2"]terthiophene | 3.500 g | 338.385 | 10.343 mmol | 1.0 |
| N-Bromosuccinimide for synthesis | 3.866 g | 177.985 | 21.721 mmol | 2.1 |
| N,N-Dimethylformamide for analysis | 40.000 ml | 73.094 | 514.406 mmol | 49.7 |

| Product | Amount | M | Content | Moles | Yield % | Th. yield |
|---|---|---|---|---|---|---|
| 5,5"-Dibromo-3',4'-dinitro-[2,2';5',2"]-terthiophene | 4.520 g | 496.177 | 82.3% | 0.007 mol | 72.5 | 5.1 g |

A-3) Synthesis of Compound V-3

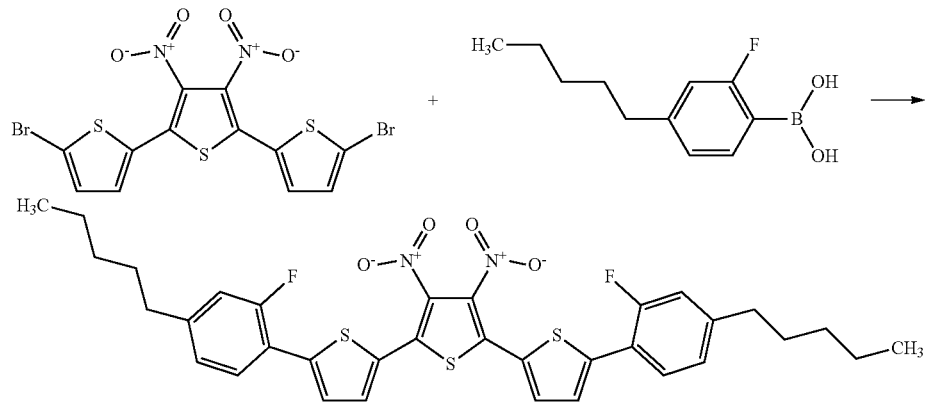

The dibromide V-2 prepared in accordance with Example A-2) and boronic acid are initially introduced in 40 ml of toluene (under nitrogen). The carbonate solution is added to the batch. The catalyst and the ligand are subsequently added, and the mixture is heated to the boil and stirred under reflux overnight. According to a thin-layer check, everything has reacted. The batch is allowed to cool, and the aqueous phase is separated off. The aqueous phase is extracted once more with toluene. The combined org. phases are dried, filtered and evaporated in a rotary evaporator, giving 5.28 g of red-brown solid crude product, which is eluted through a 250 ml silica-gel frit with toluene/heptane 1:1. The two dark-red product fractions are combined and evaporated and crystallised from 35 ml of heptane/toluene 4:1. The product does not dissolve completely (−20° C.). The yield is 2.04 g of red flakes; HPLC: 80.0%. The product is crystallised from 25 ml of toluene at 0° C. Yield: 1.05 g of red flakes; HPLC: 92.8%. The product is crystallised again from 15 ml of toluene at −20° C. Yield: 0.88 g of red flakes; HPLC: 97.3%.

The following tables summarise the starting materials employed, the product and the amounts employed and obtained.

| Name | Amount | Content | M | Moles | Equiv. |
|---|---|---|---|---|---|
| 5,5"-Dibromo-3',4'-dinitro-[2,2';5',2"]terthiophene | 2.000 g | 82.3% | 496.177 | 3.317 mmol | 1.0 |
| G5 boronic acid | 1.590 g | | 210.053 | 7.570 mmol | 2.3 |
| Tris(dibenzylideneacetone)-dipalladium(0) | 30.377 mg | | 915.700 | 0.033 mmol | 0.0 |

| Name | Amount | Content | M | Moles | Equiv. |
|---|---|---|---|---|---|
| Tris(o-tolylphosphine) | 40.379 mg | | 304.300 | 0.133 mmol | 0.0 |
| Toluene, extra pure | 40.000 ml | | 92.140 | 377.686 | 113.9 |
| Sodium carbonate (2M soln.) | 13.269 ml | 2.0 mol/l | 105.988 | 26.539 | 8.0 |

| No. | Product | Amount | M | Content | Moles | Yield % | Th. yield |
|---|---|---|---|---|---|---|---|
| 1 | 5,5''-Bis-(2-fluoro-4-pentylphenyl)-3',4'-dinitro-[2,2';5',2'']-terthiophene | 0.880 g | 666.824 | 97.3% | 0.001 mol | 38.7 | 2.2 g |

A-4) Synthesis of Compound V-4

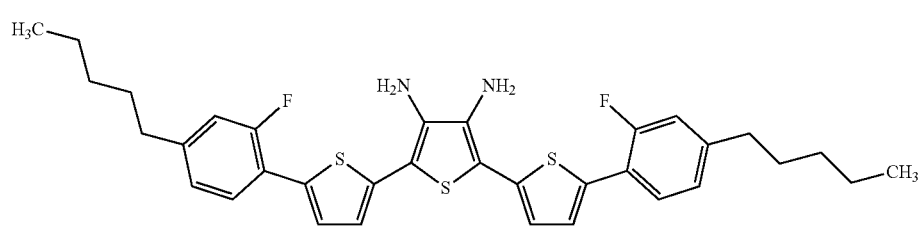

Compound V-4

Compound V-3, as prepared in accordance with Example A-3), is converted into compound V-4 shown above. The dehydrogenation catalyst and the further starting materials are indicated in the table below. The nominal pressure is 4 bar/RT, the actual pressure is 4.4 bar/RT. The experiment duration is 38 h and the uptake of hydrogen is 230 ml. The product is filtered off with suction and transferred under argon. The hydrogenation solution is evaporated to dryness in a rotary evaporator, giving, as residue, 1.27 g of dark product, HPLC: 42.0%, conversion +40.9% according to the thin-layer chromatogram.

The following tables summarise the starting materials employed, the product and the amounts employed and obtained.

| Name | Amount | Content | M | Moles | Equiv. |
|---|---|---|---|---|---|
| 5,5''-Bis-(2-fluoro-4-pentylphenyl)-3',4'-dinitro-[2,2';5',2'']-terthiophene | 0.900 g | 97.3% | 666.824 | 0.001 mol | 1.0 |
| Tetrahydrofuran for analysis | 20.000 ml | | 72.106 | 212.299 mmol | 169.2 |
| 5% Pd/C E101 R (~54% $H_2O$), Degussa | 0.200 g | | | | |
| Hydrogen 3.0 | 168.655 ml | | 22400.000 | 7.529 mmol | 6.0 |

| Product | Amount | M | Content | Moles | Yield % | Th. yield |
|---|---|---|---|---|---|---|
| 5,5''-Bis-(2-fluoro-4-pentylphenyl)-[2,2';5',2'']terthiophene-3',4'-diamine | 1.270 g | 606.858 | 42.0% | 0.001 mol | 70.0 | 0.8 g |

A-5) Synthesis of Compound V-5

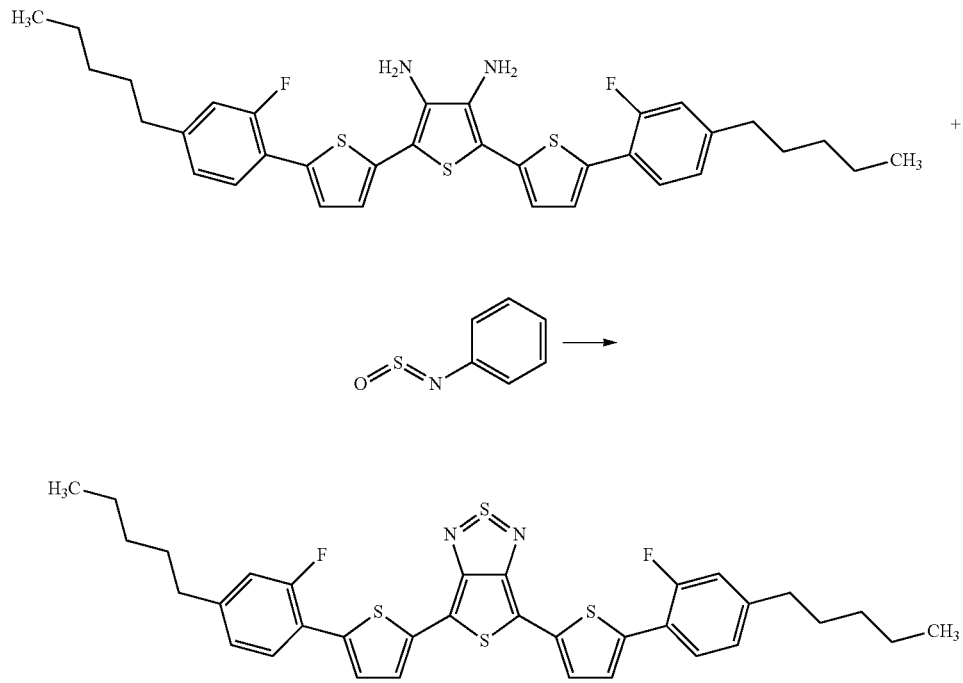

Compound V-4, as prepared in accordance with Example A-4), is converted into compound V-5 according to the invention shown above.

The amine A-4) is initially introduced in the flask in pyridine under argon. The N-thionylaniline is added, and the mixture is stirred at 50° C. for 5 h. The mixture is subsequently cooled and stirred at room temperature over the weekend. According to the thin-layer chromatogram (toluene), conversion is complete, and a new green spot is obtained. MTB/toluene is added to the reaction mixture, which is washed a number of times with HCl/water. The organic phase is dried and evaporated to dryness in a rotary evaporator, giving, as crude product, 1.3 g of black-green oil. The crude product is eluted through a column with silica gel with heptane/chlorobutane 3:2, and a green spot is isolated: 270 mg of solid, dark-green product; HPLC: 94.9%. This is crystallised from 20 ml of toluene at −20° C., giving, as product, 222 mg of blue-green coal-like powder; HPLC: 96.2%. The structural formula V-5 is confirmed by means of mass spectroscopy and NMR.

The following tables summarise the starting materials employed, the product and the amounts employed and obtained.

| Name | Amount | Content | M | Moles | Equiv. |
|---|---|---|---|---|---|
| 5,5''-Bis-(2-fluoro-4-pentyl-phenyl)[2,2';5',2'']terthiophene-3',4'-diamine | 1.270 g | 42.0% | 606.858 | 0.879 mmol | 1.0 |
| Pyridine for analysis | 10.000 ml | | 79.102 | 0.124 mol | 141.0 |
| N-Thionylaniline | 0.390 g | | 139.176 | 0.003 mol | 3.2 |

| Product | Amount | M | Content | Moles | Yield % | Th. yield |
|---|---|---|---|---|---|---|
| C$_{34}$H$_{32}$F$_2$N$_2$S$_4$ | 220.000 mg | 634.892 | 96.2% | 0.000 mol | 38.3 | 558.0 mg |

Examples A-6 to A-8

Compound V-8 is prepared in a synthetic process, as shown in the following scheme, in accordance with the following Working Examples A-6) to A-8).

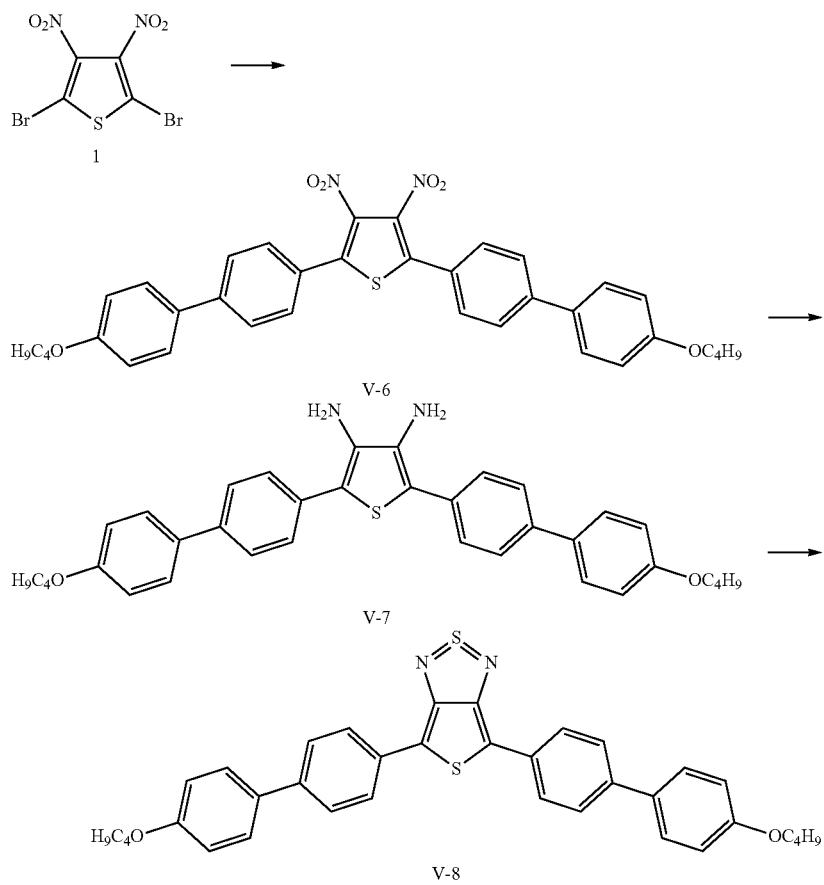

A-6) Synthesis of Compound V-6

A mixture of compound 1 (2 g, 6 mmol), 4-butoxybiphenyl-4'-boronic acid (3.75 g, 13.3 mmol), sodium metaborate tetrahydrate (3.3 g, 24 mmol), bis(triphenylphosphine)palladium(II) chloride (169 mg, 0.24 mmol), THF (50 ml), water (22.5 ml) and hydrazine hydrate (0.02 ml, 0.42 mmol) is stirred at 65° C. for 18 h under a nitrogen atmosphere. The mixture is then subjected to conventional aqueous work-up, and the crude product is purified by filtration in toluene through a silica-gel frit (400 ml). Crystallisation from ethanol/toluene 9:1 (40 ml) at 0° C. gives V-6 as fine yellow needles (HPLC purity: 99.6%) in a yield of 16%.

A-7) Synthesis of Compound V-7

A solution of compound V-6 (900 mg, 1 mmol) in THF (10 ml) is hydrogenated in the presence of 5% Pd/C (200 mg) at 4 bar and RT until the theoretical amount of hydrogen has been taken up. The catalyst is filtered off, and the solution is evaporated to dryness in a rotary evaporator. The crude product V-7 is employed in the next synthesis step without further purification.

A-8) Synthesis of Compound V-8

The diamine V-7 (800 mg, 1.42 mmol) is dissolved in pyridine (10 ml) under an argon atmosphere, and N-thionylaniline (396 mg, 3 mmol) is added with stirring. The mixture is stirred at 50° C. for 17 h, subjected to conventional aqueous work-up, and the combined organic extracts are evaporated to dryness in a rotary evaporator. The crude product (2.5 g of blue-violet shimmering solid) is chromatographed in toluene through a silica-gel frit (300 ml) (540 mg, HPLC purity: 98.1%). Further purification is carried out by crystallisation from chlorobutane (50 ml) at −20° C. Yield: 466 mg (54%) of V-8 as dark-blue crystals.

A-9) Synthesis of Compound V-9

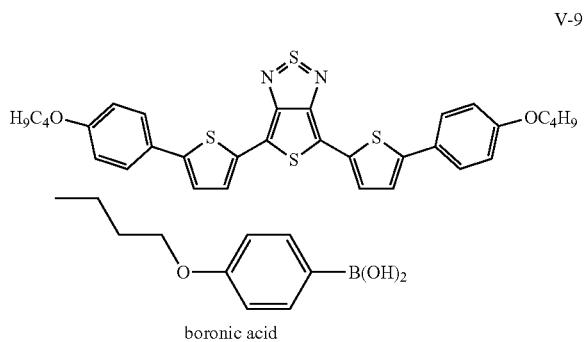

boronic acid

Compound V-9) of the formula shown above is prepared analogously to Working Examples A-1) to A-5). Example A-3) is modified here by employing the corresponding boronic acid shown above.

B) Determination of the Properties of the Dyes

The dyes prepared are investigated with respect to their physical properties in order to establish their suitability for use in devices for regulating the transmission of energy. For comparison, the corresponding properties are indicated for compound D-1 (structure see below).

TABLE

Structures of the dyes used

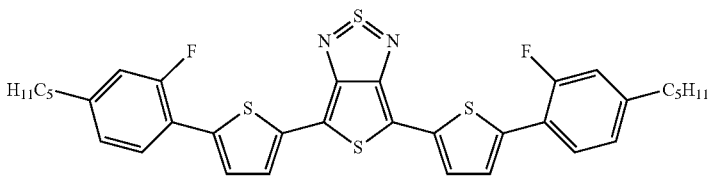

Compound (1)

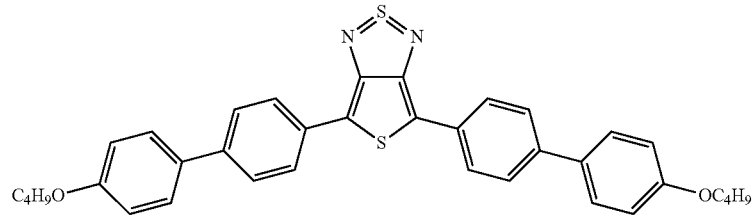

Compound (8)

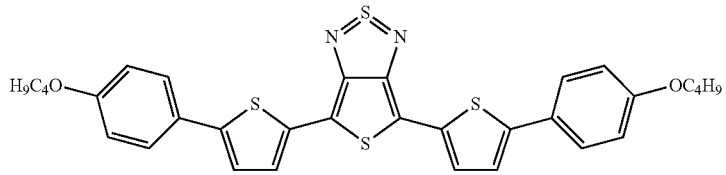

Compound (9)

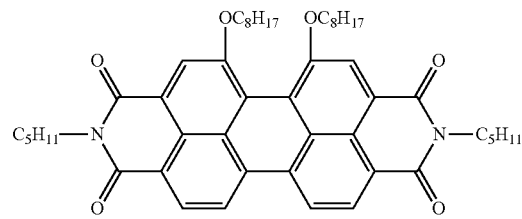

D-1

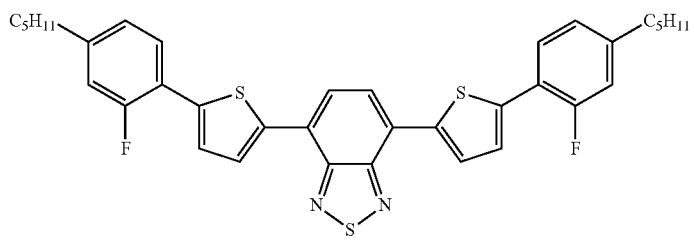

D-2

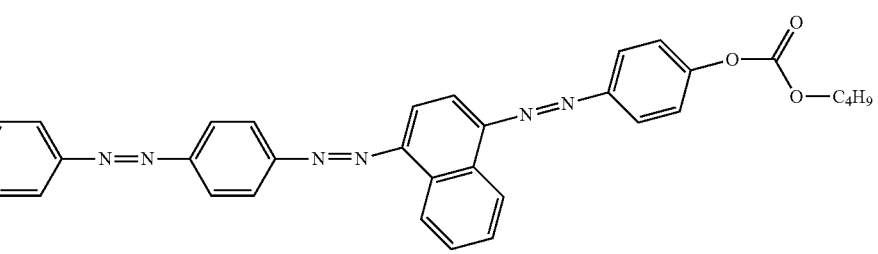

D-3

TABLE

Physical properties of the dyes

| Dye | Host mixture | Colour | Band No. | Conc. in % | Layer thickness in μm | $\lambda_{max}$ nm | $\varepsilon_{iso}$ | R |
|---|---|---|---|---|---|---|---|---|
| D-1 | M-1 | red-violet | 1 | 0.25 | 24.3 | 595 | 653 | 0.71 |
|  |  |  | 2 |  |  | 425 | 148 | −0.07 |
| Comp. (1) | M-1 | green | 1 | 0.25 | 23.1 | 698 | 343 | 0.68 |
|  |  |  | 2 |  |  | 417 | 503 | 0.72 |
| Comp. (8) | M-1 | blue | 1 | 0.25 | 23.8 | 616 | 324 | 0.77 |
|  |  |  | 2 |  |  | 370 | 768 | 0.74 |
| Comp. (9) | M-1 | green | 1 | 0.25 | 23.6 | 717 | 335 | 0.71 |
|  |  |  | 2 |  |  | 413 | 545 | 0.72 |

The measurements show that the thienothiadiazole compounds according to the invention have excellent properties with respect to the degree of anisotropy R. In particular, the virtually identical degree of anisotropy in the second shorter-wave absorption band should be emphasised. The absorptions have positive dichroism both in the long-wave and in the shorter-wave band.

By contrast, comparative substance D-1 has positive dichroism in the longer-wave absorption band and slightly negative dichroism in the shorter-wave absorption band. A change in the dichroism thus takes place over the wavelengths. In a black mixture comprising a plurality of exclusively positively dichroic dyes using compound D-1, this negative value of D-1 in the region of the second band would then result in a reduction in the transmission range potentially achievable in a display. This would represent a disadvantage which is eliminated by the provision of the compounds according to the invention with their identical direction of the dichroism.

The compounds according to the invention exhibit different absorption colours depending on the substitution pattern, so that a mixture comprising two or more of the dyes according to the invention already covers a large part of the visible spectrum. If a red-absorbent dye is added as further dye, a black mixture can be obtained.

Some representatives of the dyes according to the invention exhibit a green colour, which can otherwise only be obtained by the combination of a yellow and blue dye. The use of green dyes can already give rise to black together with a red dye, so that the possibility exists of preparing black mixtures from just two different dyes.

C) Preparation of Liquid-Crystalline Media Comprising the Dyes

C-1) Preparation of LC Dye Mixtures LC-1 to LC-4

The example shows the possible preparation in principle of solutions of the compounds according to the invention in liquid-crystalline mixtures. The following dyes are added to the base mixture M-1 (see below) in the proportions indicated, and a solution is prepared:

TABLE

LC dye mixtures LC-1 to LC-4

| | Dye | Proportion |
|---|---|---|
| LC-1 | D-1 | 0.25% by weight |
| LC-2 | compound (1) | 0.25% by weight |
| LC-3 | compound (8) | 0.25% by weight |
| LC-4 | compound (9) | 0.25% by weight |

TABLE

Composition of host mixture M-1

| | | |
|---|---|---|
| Clearing point | | 114.5° C. |
| Delta-n | | 0.1342 |
| $n_e$ | | 1.6293 |
| $n_o$ | | 1.4951 |
| Composition | Compound | |
| | CPG-3-F | % by weight |
| | CPG-5-F | 5 |
| | CPU-3-F | 5 |
| | CPU-5-F | 15 |
| | CP-3-N | 15 |
| | CP-5-N | 16 |
| | CCGU-3-F | 16 |
| | CGPC-3-3 | 7 |
| | CGPC-5-3 | 4 |
| | CGPC-5-5 | 4 |
| | CCZPC-3-3 | 4 |
| | CCZPC-3-4 | 3 |
| | CCZPC-3-5 | 3 |

D) Use of Liquid-Crystalline Media Comprising Dye (1) According to the Invention in Devices for Regulating the Passage of Energy In order to produce the devices, the liquid-crystal mixture comprising dye (1) is introduced into the interspace of the following layer arrangement:
  substrate layer
  ITO layer
  polyimide alignment layer
  interspace kept open using spacers
  polyimide alignment layer
  ITO layer
  substrate layer The liquid-crystal layer in this arrangement is aligned in a planar manner with antiparallel pretilt angle. This alignment is achieved by two polyimide layers rubbed antiparallel to one another. The thickness of the liquid-crystalline layer is defined by spacers and is usually 25 μm.

Values for the degree of light transmission $\tau_v$ for both the dark and bright switching states of the device are determined and are shown below. The bright switching state is achieved by application of a voltage, while the dark switching state is present without voltage. Furthermore, the colour location of the device (in CIE coordinates) in the dark and bright states is determined.

The measurement is carried out with the device comprising the liquid-crystalline medium with dyes in the measurement beam and a device of the same construction correspondingly without the dyes in the reference beam. Reflection and absorption losses of the cell are thereby eliminated.

The value $\tau_v$ and the CIE coordinates (x,y) are defined as follows:
$\tau_v$=degree of light transmission, determined in accordance with DIN EN410

The colour location (for white, grey, black) of the basic standard illuminant D65 here is at x=0.3127 and y=0.3290 (Manfred Richter, Einführung in die Farbmetrik [Introduction to Colorimetry], second edition 1991, ISBN 3-11-008209-8). The colour locations (x,y) indicated all relate to the standard illuminant D65 and the 2° standard observer in accordance with CIE 1931.

Device Example 1

The following liquid-crystalline mixture is used:

| Constituent | Proportion |
| --- | --- |
| M-1 | 98.601% |
| Compound (1) according to the invention | 0.638% |
| D-1 | 0.385% |
| D-2 | 0.376% |

Measurement values obtained for the device:
dark state: x=0.313; y=0.329; $\tau_v$=35%
bright state: x=0.313; y=0.333; $\tau_v$=66%

In the example, adequate solubility of the dyes in the liquid-crystalline medium is apparent. Furthermore, the example shows that the device can be switched from a dark state having significantly lower light transmission to a bright state having significantly increased light transmission by application of a voltage.

Device Example 2

| Constituent | Proportion |
| --- | --- |
| M-1 | 98.981% |
| Compound (1) | 0.600% |
| D-3 | 0.419% |

Measurement values obtained for the device:
dark state: x=0.316; y=0.330; $\tau_v$=35%
bright state: x=0.315; y=0.333; $\tau_v$=68.2%

In the example, adequate solubility of the dyes in the liquid-crystalline medium is apparent. Furthermore, the example shows that the device can be switched from a dark state having significantly lower light transmission to a bright state having significantly increased light transmission by application of a voltage. The example shows a black mixture consisting of only two dyes, a green dye and a red dye.

The invention claimed is:

1. A device for regulating the passage of energy from an outside space into an inside space, said device comprising a switching layer, where the switching layer comprises a liquid-crystalline medium containing one or more compounds of formula (I) and one or more different compounds:

formula (I)

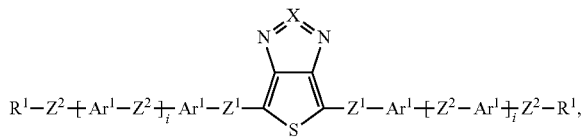

where:
X is S;
Z$^1$ is, independently of one another, a single bond, —CR$^3$=CR$^3$— or —C≡C—; or two, three, four or five groups combined with one another, selected from —CR$^3$=CR$^3$— and —C≡C—;
Z$^2$ is, independently of one another, a single bond, O, S, C(R$^3$)$_2$, —CR$^3$=CR$^3$— or —C≡C—; or two, three, four or five groups combined with one another, selected from O, S, C(R$^3$)$_2$, —CR$^3$=CR$^3$— and —C≡C—;
Ar$^1$ is, independently of one another, an aryl or heteroaryl group having 5 to 30 aromatic ring atoms, which is unsubstituted or substituted by one or more radicals R$^4$;
R$^1$ is, independently of one another, a straight-chain or branched chain alkyl or group having 3 to 10 C atoms;
R$^3$, R$^4$ are, independently of one another, H, D, F, Cl, CN, or an alkyl, alkoxy or thioalkoxy group having 1 to 10 C atoms, which is unsubstituted or substituted by one or more radicals R$^5$, where one or more CH$_2$ groups in the alkyl, alkoxy or thioalkoxy groups may each be replaced by —R$^5$C=CR$^5$—, —C≡C—, C=O, C=S, —C(=O)O—, —OC(=O)—, Si(R$^5$)$_2$, NR$^5$, —O— or —S—;
R$^5$ is, independently of one another, H, D, F, Cl, CN, N(R$^6$)$_2$, an alkyl, alkoxy or thioalkoxy group having 1 to 10 C atoms or an alkenyl or alkynyl group having 2 to 20 C atoms, where the above-mentioned groups are each unsubstituted or substituted by one or more radicals R$^6$ and where one or more CH$_2$ groups in the above-mentioned groups may each be replaced by —R$^6$C=CR$^6$—, —C≡C—, C=O, C=S, —C(=O)O—, —O(C=O)—, Si(R$^6$)$_2$, NR$^6$, —O— or —S—, or an aryl or heteroaryl group having 5 to 30 aromatic ring atoms, which may in each case be substituted by one or more radicals R$^6$;
R$^6$ is, independently of one another, H, F or an aliphatic organic radical having 1 to 20 C atoms, in which one or more H atoms may each be replaced by F, or an aryl or heteroaryl group having 5 to 20 C atoms, in which one or more H atoms may each be replaced by F; and
i is, independently of one another, equal to 1, 2, 3, 4 or 5.

2. The device according to claim 1, wherein Z$^1$ is a single bond.

3. The device according to claim 1, wherein Z$^2$ is in each case, independently of one another, a single bond, —C(R$^3$)$_2$C(R$^3$)$_2$—, —CR$^3$=CR$^3$—, —C≡C—, —OC(R$^3$)$_2$— or —C(R$^3$)$_2$O—.

4. The device according to claim 1, wherein Ar$^1$ is in each case, independently of one another, an aryl group having 6 to 15 C atoms or a heteroaryl group having 5 to 15 C atoms, which in each case is unsubstituted or substituted by one or more radicals R$^4$.

5. The device according to claim 1, wherein Ar$^1$ is in each case benzene, fluorene, naphthalene, pyridine, pyrimidine, pyrazine, triazine, thiophene, thiophene with condensed-on 1,4-dioxane ring, benzothiophene, dibenzothiophene, benzodithiophene, cyclopentadithiophene, thienothiophene, indenothiophene, dithienopyrrole, silolodithiophene, selenophene, benzoselenophene, dibenzoselenophene, furan, benzofuran, dibenzofuran, or quinoline, which in each case is optionally substituted by radicals R$^4$.

6. The device according to claim 1, wherein at least one Ar$^1$ is a sulfur-containing heteroaryl group, which is unsubstituted or substituted by one or more radicals R$^4$.

7. The device according to claim 1, wherein R$^1$ is in each case, independently of one another, a straight-chain alkyl having 3 to 10 C atoms.

8. The device according to claim 1, index i is 1 or 2.

9. The device according to claim 1, wherein the degree of anisotropy R of the compound of formula (I) is greater than 0.4.

10. The device according to claim 1, wherein said device is electrically switchable.

11. The device according to claim 1, wherein said device is connected to a solar cell or another device for conversion of light and/or heat energy into electrical energy.

12. A window comprising a device according to claim 1.

13. An electrochemical device comprising a compound according to formula (I):

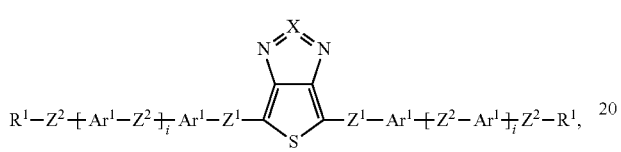

formula (I)

where:
X is S;
$Z^1$ is, independently of one another, a single bond, —$CR^3$=$CR^3$— or —C≡C—; or two, three, four or five $Z^1$ groups combined with one another, are selected —$CR^3$=$CR^3$— and —C≡C—;
$Z^2$ is, independently of one another, a single bond, O, S, $C(R^3)_2$, —$CR^3$=$CR^3$— or —C≡C—; or two, three, four or five $Z^2$ groups combined with one another, are selected from O, S, $C(R^3)_2$, —$CR^3$=$CR^3$— and —C≡C—;
$Ar^1$ is, independently of one another, an aryl or heteroaryl group having 5 to 30 aromatic ring atoms, which is unsubstituted or substituted by one or more radicals $R^4$;
$R^1$ is, independently of one another, a straight-chain or branched chain alkyl or alkoxy group having 3 to 10 C atoms;
$R^3$, $R^4$ are, independently of one another, H, D, F, Cl, CN, or an alkyl, alkoxy or thioalkoxy group having 1 to 10 C atoms, which is unsubstituted or substituted by one or more radicals $R^5$, where one or more $CH_2$ groups in the alkyl, alkoxy or thioalkoxy groups may each be replaced by —$R^5C$=$CR^5$—, —C≡C—, C=O, C=S, —C(=O)O—, —OC(=O)—, $Si(R^5)_2$, $NR^5$, —O— or —S—;
$R^5$ is, independently of one another, H, D, F, Cl, CN, $N(R^6)_2$, an alkyl, alkoxy or thioalkoxy group having 1 to 10 C atoms or an alkenyl or alkynyl group having 2 to 20 C atoms, where the above-mentioned groups are in each case unsubstituted or substituted by one or more radicals $R^6$ and where one or more $CH_2$ groups in the above-mentioned groups may each be replaced by —$R^6C$=$CR^6$—, —C≡C—, C=O, C=S, —C(=O)O—, —O(C=O)—, $Si(R^6)_2$, $NR^6$, —O— or —S—, or an aryl or heteroaryl group having 5 to 30 aromatic ring atoms, which in each case is unsubstituted or substituted by one or more radicals $R^6$;
$R^6$ is, independently of one another, H, F or an aliphatic organic radical having 1 to 20 C atoms, in which one or more H atoms may each be replaced by F, or an aryl or heteroaryl group having 5 to 20 C atoms, in which one or more H atoms each be replaced by F; and
i is, independently of one another, equal to 1, 2, 3, 4 or 5.

14. A window, organic solar cell, or organic electronic component comprising a liquid-crystalline mixture comprising at least one compound according to formula (I):

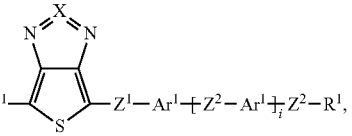

formula (I)

where:
X is S;
$Z^1$ is, independently of one another, a single bond, —$CR^3$=$CR^3$— or —C≡C—; or two, three, four or five $Z^1$ groups combined with one another, are selected —$CR^3$=$CR^3$— and —C≡C—;
$Z^2$ is, independently of one another, a single bond, O, S, $C(R^3)_2$, —$CR^3$=$CR^3$— or —C≡C—; or two, three, four or five $Z^2$ groups combined with one another, are selected from O, S, $C(R^3)_2$, —$CR^3$=$CR^3$— and —C≡C—;
$Ar^1$ is, independently of one another, an aryl or heteroaryl group having 5 to 30 aromatic ring atoms, which is unsubstituted or substituted by one or more radicals $R^4$;
$R^1$ is, independently of one another, a straight-chain or branched chain alkyl or alkoxy group having 3 to 10 C atoms;
$R^3$, $R^4$ are, independently of one another, H, D, F, Cl, CN, or an alkyl, alkoxy or thioalkoxy group having 1 to 10 C atoms, which is unsubstituted or substituted by one or more radicals $R^5$, where one or more $CH_2$ groups in the alkyl, alkoxy or thioalkoxy groups may each be replaced by —$R^5C$=$CR^5$—, —C≡C—, C=O, C=S, —C(=O)O—, —OC(=O)—, $Si(R^5)_2$, $NR^5$, —O— or —S—;
$R^5$ is, independently of one another, H, D, F, Cl, CN, $N(R^6)_2$, an alkyl, alkoxy or thioalkoxy group having 1 to 10 C atoms or an alkenyl or alkynyl group having 2 to 20 C atoms, where the above-mentioned groups are in each case unsubstituted or substituted by one or more radicals $R^6$ and where one or more $CH_2$ groups in the above-mentioned groups may each be replaced by —$R^6C$=$CR^6$—, —C≡C—, C=O, C=S, —C(=O)O—, —O(C=O)—, $Si(R^6)_2$, $NR^6$, —O— or —S—, or an aryl or heteroaryl group having 5 to 30 aromatic ring atoms, which in each case is unsubstituted or substituted by one or more radicals $R^6$;
$R^6$ is, independently of one another, H, F or an aliphatic organic radical having 1 to 20 C atoms, in which one or more H atoms may each be replaced by F, or an aryl or heteroaryl group having 5 to 20 C atoms, in which one or more H atoms each be replaced by F; and
i is, independently of one another, equal to 1, 2, 3, 4 or 5.

15. A compound of formulae (IIa) to (IIc):

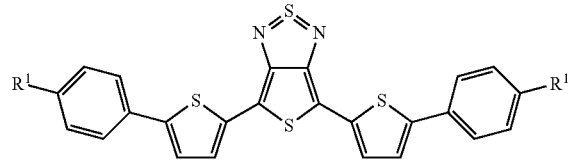

formula (IIa)

formula (IIb)

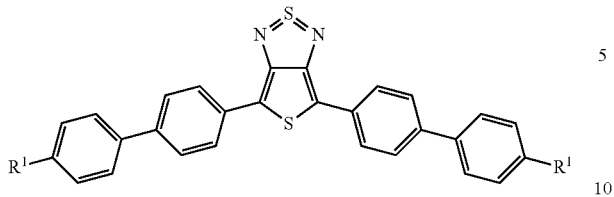

formula (IIc)

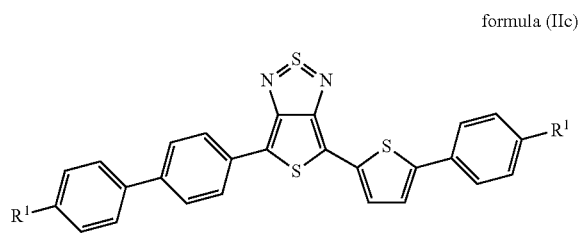

wherein
- $R^1$ is, independently of one another, a straight-chain or branched chain alkyl or alkoxy group having 3 to 10 C atoms; and
- benzene and thiophene rings are optionally fluorinated.

16. A compound of formulae (III) or (IV):

—C≡C—, C=O, C=S, —C(=O)O—, —OC(=O)—, Si($R^5$)$_5$, $NR^5$, —O— or —S—;
- $R^5$ is, independently of one another, H, D, F, Cl, CN, N($R^6$)$_2$, an alkyl, alkoxy or thioalkoxy group having 1 to 10 C atoms or an alkenyl or alkynyl group having 2 to 20 C atoms, where the above-mentioned groups are in each case unsubstituted or substituted by one or more radicals $R^6$ and where one or more CH$_2$ groups in the above-mentioned groups may each be replaced by —$R^6$C=C$R^6$—, —C≡C—, C=O, C=S, —C(=O)O—, —O(C=O)—, Si($R^6$)$_2$, $NR^6$, —O— or —S—, or an aryl or heteroaryl group having 5 to 30 aromatic ring atoms, which in each case is unsubstituted or substituted by one or more radicals $R^6$;
- $R^6$ is, independently of one another, H, F or an aliphatic organic radical having 1 to 20 C atoms, in which one or more H atoms may each be replaced by F, or an aryl or heteroaryl group having 5 to 20 C atoms, in which one or more H atoms each be replaced by F;
- $R^7$ is, independently of one another, H, D, F, Cl, CN, N($R^6$)$_2$, an alkyl, alkoxy or thioalkoxy group having 1 to 10 C atoms or an alkenyl or alkynyl group having 2 to 20 C atoms, where the above-mentioned groups are in each case unsubstituted or substituted by one or more radicals $R^6$ and where one or more CH$_2$ groups in the above-mentioned groups may each be replaced by —$R^6$C=C$R^6$—, —C≡C—, C=O, C=S, —C(=O)O—, —O(C=O)—, Si($R^6$)$_2$, $NR^6$, —O— or —S—, or an aryl or heteroaryl group having 5 to 30 aromatic ring atoms, which in each case is unsubstituted or substituted by one or more radicals $R^6$;

formula (III)

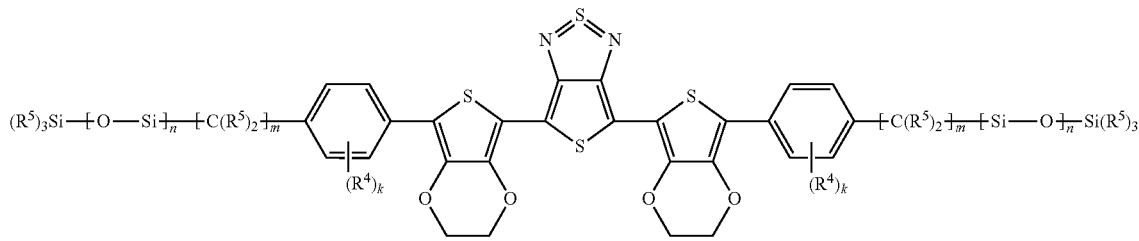

formula (IV)

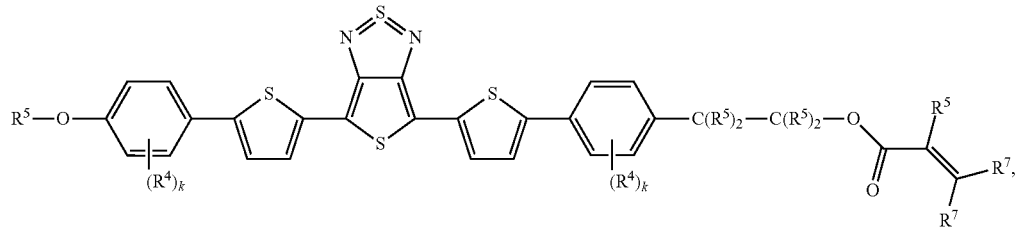

wherein
- $R^4$ is H, D, F, Cl, CN, or an alkyl, alkoxy or thioalkoxy group having 1 to 10 C atoms, which is unsubstituted or substituted by one or more radicals $R^5$, where one or more CH$_2$ groups in the alkyl, alkoxy or thioalkoxy groups may each be replaced by —$R^5$C=C$R^5$—,
- k is in each case 0, 1, 2, 3 or 4;
- m is in each case 0, 1, 2, 3, 4, 5 or 6; and
- n is in each case 1, 2, 3, 4 or 5.

17. The compound according to claim 15, wherein said compound is selected from compounds (1), (2), (4), (5), (7), (8), and (9):

compound (1)
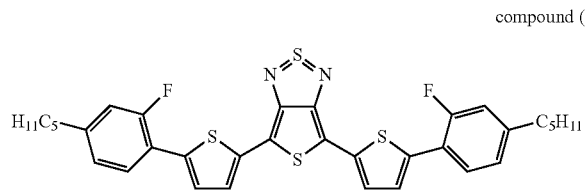
compound (2)
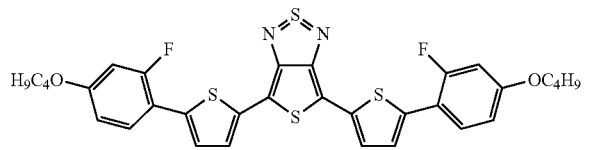
compound (4)
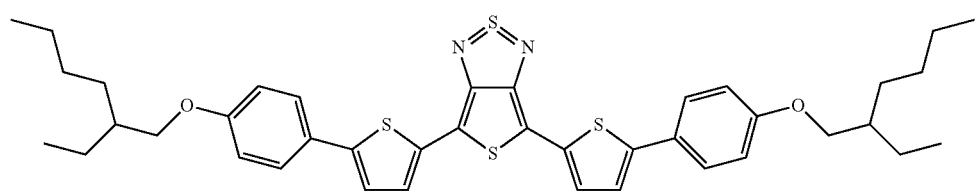
compound (5)
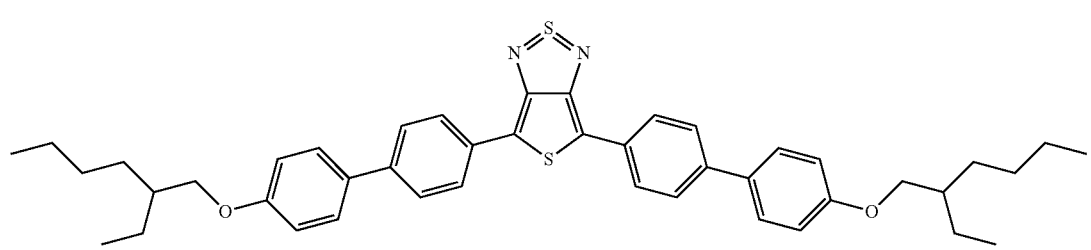
compound (7)
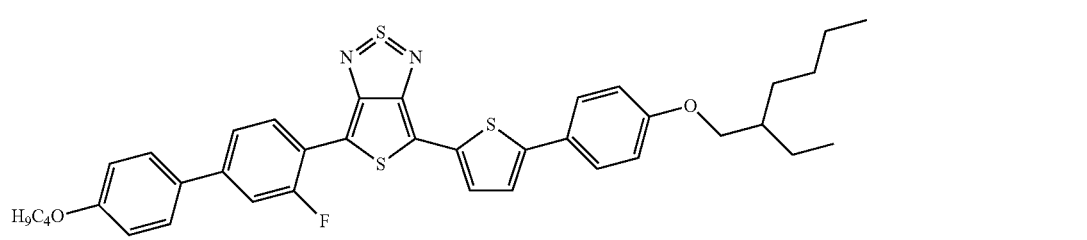
compound (8)
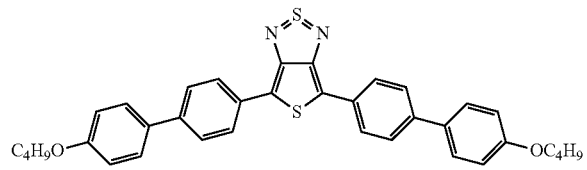
compound (9)
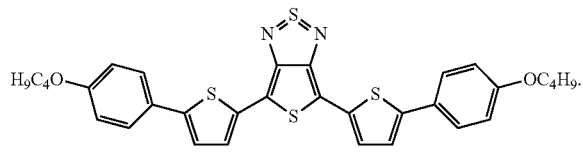
18. The device according to claim 1, wherein index i is 1, 2, 3, or 4.
19. The device according to claim 1, wherein index i is 1, 2 or 3.
20. The device according to claim 1, wherein said compound is formulae (IIa) to (IIc):
formula (IIa)
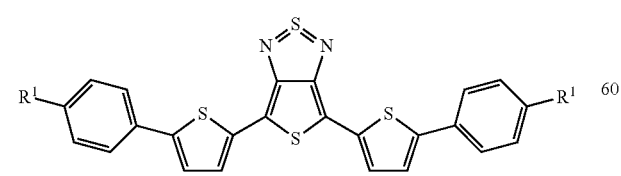
formula (IIb)
formula (IIc)
wherein benzene and thiophene rings are optionally fluorinated.

21. The device according to claim 1, wherein said compound is selected from compounds (1), (2), (4), (5), (7), (8), and (9):
compound (1)
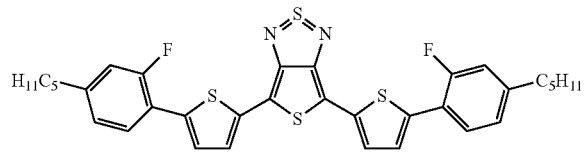
compound (2)
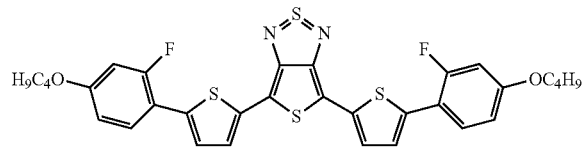
compound (4)
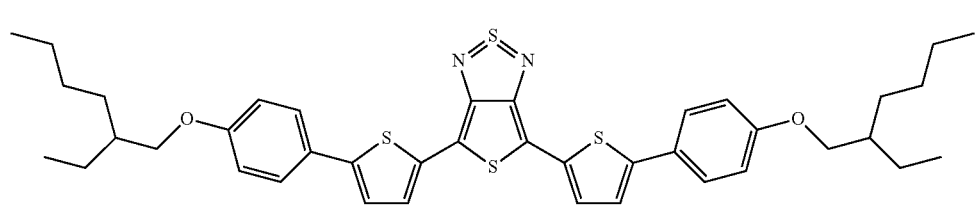
compound (5)
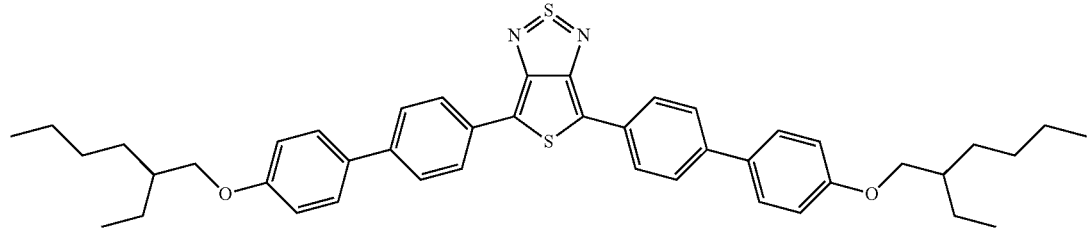
compound (7)
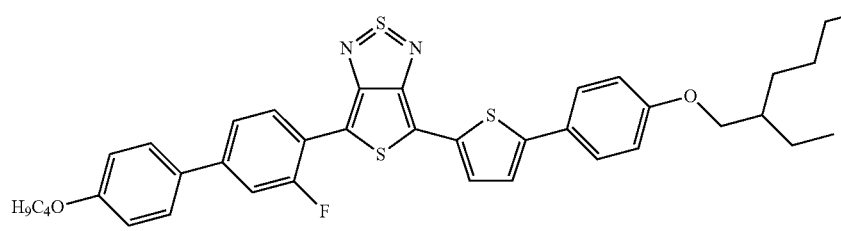
compound (8)
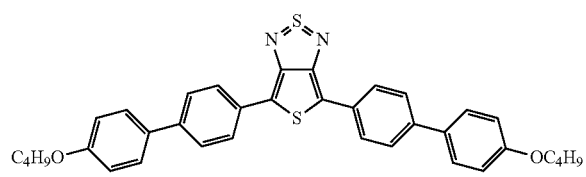
compound (9)
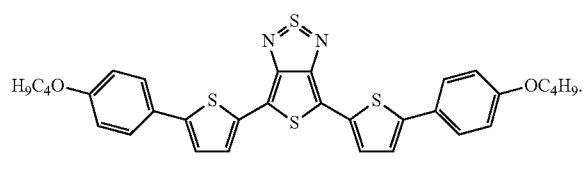
* * * * *